US009531575B2

(12) United States Patent
Li et al.

(10) Patent No.: US 9,531,575 B2
(45) Date of Patent: Dec. 27, 2016

(54) SYSTEMS AND METHODS FOR PROVIDING AND/OR USING AN OFDN-OQAM STRUCTURE

(71) Applicant: InterDigital Patent Holdings, Inc., Wilmington, DE (US)

(72) Inventors: Jialing Li, San Diego, CA (US); Rui Yang, Greenlawn, NY (US); I-Tai Lu, Dix Hills, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/390,650

(22) PCT Filed: Apr. 5, 2013

(86) PCT No.: PCT/US2013/035355
§ 371 (c)(1),
(2) Date: Oct. 3, 2014

(87) PCT Pub. No.: WO2013/152249
PCT Pub. Date: Oct. 10, 2013

(65) Prior Publication Data
US 2015/0092885 A1 Apr. 2, 2015

Related U.S. Application Data

(60) Provisional application No. 61/620,734, filed on Apr. 5, 2012.

(51) Int. Cl.
*H04B 7/02* (2006.01)
*H04L 27/34* (2006.01)
(Continued)

(52) U.S. Cl.
CPC .......... *H04L 27/3416* (2013.01); *H04L 25/08* (2013.01); *H04L 27/264* (2013.01);
(Continued)

(58) Field of Classification Search
CPC .............. H04L 27/3416; H04L 27/366; H04L 27/2631; H04L 27/264; H04L 27/2698; H04L 25/08
(Continued)

(56) References Cited

U.S. PATENT DOCUMENTS 7,099,396 B1 * 8/2006 Combelles et al. .......... 375/260
7,609,611 B1 * 10/2009 Siohan et al. ................ 370/208
(Continued)

FOREIGN PATENT DOCUMENTS

EP 1032174 A 8/2000

OTHER PUBLICATIONS

3rd Generation Partnership Project (3GPP), TR 25.892 V6.0.0, "Technical Specification Group Radio Access Network, Feasibility Study for Orthogonal Frequency Division Multiplexing (OFDM) for UTRAN Enhancement (Release 6)", Jun. 2004, pp. 1-91.
(Continued)

*Primary Examiner* — Khanh C Tran
(74) *Attorney, Agent, or Firm* — Condo Roccia Koptiw LLP

(57) ABSTRACT

Systems and methods for providing orthogonal frequency division multiplexing-offset quadrature amplitude modulation (OFDM-OQAM) structure may be disclosed. For example, a synthesis filter bank (SFB) and/or an analysis filter bank (AFB) for a filter length may be derived. The filter length may be odd. Additionally, the AFB may be an inverse discrete Fourier transform (IDFT)-based AFB and/or a discrete Fourier transform (DFT)-based AFB.

15 Claims, 27 Drawing Sheets

(51) Int. Cl.
   *H04L 27/26* (2006.01)
   *H04L 25/08* (2006.01)
   *H04L 27/36* (2006.01)
(52) U.S. Cl.
   CPC ...... *H04L 27/2631* (2013.01); *H04L 27/2698* (2013.01); *H04L 27/366* (2013.01)
(58) Field of Classification Search
   USPC ....... 375/260, 268, 285, 295–296, 300, 316, 375/346, 350; 370/206, 210; 708/400, 708/403–405
   See application file for complete search history.

(56) References Cited

U.S. PATENT DOCUMENTS

| | | | |
|---|---|---|---|
| 2009/0086849 A1* | 4/2009 | Tsai et al. | 375/298 |
| 2011/0182380 A1* | 7/2011 | Muhammad et al. | 375/295 |
| 2014/0064407 A1* | 3/2014 | Dandach et al. | 375/298 |
| 2014/0169501 A1* | 6/2014 | Nazarathy et al. | 375/316 |

OTHER PUBLICATIONS

Baltar et al., "A Method to Convert Near-Perfect into Perfect Reconstruction Fir Prototype Filters for Modulated Filter Banks", IEEE, May 15, 2011, pp. 1768-1771.
Bellanger et al., "FBMC Physical Layer: A Primer", PHYDYAS, Jun. 2010, pp. 1-31.
Farhang-Boroujeny, Behrouz, "CosineModulated and Offset QAMFilter Bank Multicarrier Techniques: A Continuous-Time Prospect", Hindawi Publishing Corporation, EURASIP Journal on Advances in Signal Processing, Feb. 8, 2010, pp. 1-16.
Lin et al., "Modulation Flexibility in PLC: A Unified MCM Transceiver Design and Implementation", IEEE Transactions on Circuits and Systems-I: Regular Papers, vol. 57, No. 10, Oct. 2010, pp. 2762-2775.
Schaich, Frank, "Filterbank Based Multi Carrier Transmission (FBMC)-Evolving OFDM: FBMC in the Context of WiMAX", Wireless Conference (EW), 2010 European, Apr. 12-15, 2010, pp. 1051-1058.
Stitz, Tobias Hidalgo, "Filter Bank Techniques for the Physical Layer in Wireless Communications", Tampere University of Technology, Oct. 2010, 193 pages.
Viholainen et al., "Efficient Implementation of Complex Modulated Filter Banks Using Cosine and Sine Modulated Filter Banks ", Hindawi Publishing Corporation, EURASIP Journal on Applied Signal Processing, 2006, pp. 1-10.
Viholainen et al., "Prototype Filter and Structure Optimization", Physical Layer for Dynamic Spectrum Access and Cognitive Radio (PHYDYAS), Jan. 2009, pp. 1-102.
Viholainen et al., "Prototype Filter Design for Filter Bank Based Multicarrier Transmission", 17th European Signal Processing Conference, Aug. 24-28, 2009, pp. 1359-1363.
Amini, Peiman, "Filterbank Multicarrier Techniques for Cognitive Radios", Department of Electrical and Computer Engineering, The University of Utah, 2009, 171 pages.

* cited by examiner

SYSTEMS AND METHODS FOR PROVIDING AND/OR USING AN OFDN-OQAM STRUCTURE

CROSS REFERENCE TO RELATED APPLICATIONS

This application is the National Stage Entry under 35 U.S.C. §371 of Patent Cooperation Treaty Application No. PCT/US2013/035355, filed on Apr. 5, 2013, which claims priority to U.S. Provisional Patent Application No. 61/620,734, filed Apr. 5, 2012.

BACKGROUND

Currently, multicarrier modulation (MCM) techniques may be used to enable transmission of a set of data over multiple narrow band subcarriers simultaneously. With an advanced wideband modulation and coding scheme (MCS), a system such as a communication system with MCM may achieve much higher spectral efficiency in frequency selective channels comparing to those using signal carrier modulation techniques. For example, a family of MCM techniques such as Filter bank multicarrier (FBMC) modulation may be used in a communication system. FBMC may include a prototype filter that may be designed or implemented to achieve a particular property or goal such as minimizing inter-symbol interference (ISI), inter-carrier interference (ICI), stop band energy, and the like. One particular type of FBMC that may be used in a communication system may include Orthogonal Frequency Division Multiplexing (OFDM). OFDM may include a time domain prototype filter that may be a simple rectangular pulse. From a complexity perspective, OFDM may be used over other FBMC techniques, because OFDM may be easier to implement and/or design in a communication system.

Although OFDM may be easier to implement, large sidelobes of the rectangular pulse in OFDM create challenging issues in a typical communication system. For example, the performance of the systems at physical (PHY) layer may be sensitive to frequency offset. In addition, in some communication systems such as those in TV white space and heterogeneous systems or networks with small cells, multiple radio links may coexist in congested spectral bands, but may be loosely controlled or coordinated in resource usage (e.g. in frequency, timing and/or power). In such a network, strong adjacent channel interference may be generated from large out-of-band emission that may be partially contributed from large sidelobes at the baseband. Additionally, in OFDM, a modulated signal may exhibit a large peak-to-average power ratio (PAPR) that may lead to low efficiency power amplifiers (PAs).

To address the foregoing (e.g. improve a PAPR, channel interference, frequency offset, resource usage, and the like), different FBMC techniques including the orthogonal frequency division multiplexing-offset quadrature amplitude modulation (OFDM-OQAM) have been developed. In OFDM-OQAM, subcarriers of the signal overlap each other to achieve a higher spectral efficiency. Real and imaginary parts of the QAM symbols may also be processed separately with 2×symbol rate unlike OFDM. As such, a filter that may be used with OFDM-OQAM may need to be carefully designed to minimize or zero out ISI and ICI while keeping the sidelobes small. Currently, due to complexity, latency and other issues, OFDM-OQAM and the filter that may be used therewith may not be suitable for use in communication systems.

SUMMARY

Systems, methods, and/or techniques for providing OFDM-OQAM (e.g. an OFDM-OQAM structure) may be disclosed. For example, a synthesis filter bank (SFB) and/or an analysis filter bank (AFB) for a filter length may be derived. In an embodiment, the filter length may be odd and the AFB may be an inverse discrete Fourier transform (IDFT)-based AFB and/or a discrete Fourier transform (DFT)-based AFB. For example, a permutation in an IDFT-based synthesis filter bank and/or a DFT-based analysis filter bank for orthogonal frequency division multiplexing-offset quadrature amplitude modulation (OFDM-OQAM) with prototype filters that may be of odd length may be used to reduce computational complexity and be compatible with an OFDM operation. Such an OFDM-OQAM that may be provided may be used as a multicarrier modulation (MCM) technique in a multicarrier communication system such as LTE system. Additionally, in an embodiment, such an OFDM-OQAM may be used as a substitute Additionally for OFDM in cognitive based communication systems such as TV white space (TVWS).

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

According to an example embodiment, structures and computational complexities associated with OFDM-OQAM may be explored for OFDM-OQAM to be used in a practical system. For example, in an embodiment, the complexity of the efficient OFDM-OQAM polyphase structure may be approximately 10 times that of OFDM. As such, for OFDM-OQAM to be considered for practical systems, efficient structures may need to be developed to minimize the complexity as well as to achieve other properties or goals (e.g., to be reusable for OFDM such that one transceiver may be operating in either OFDM or OFDM-OQAM mode).

According to an example embodiment, efficient structures for an OFDM-OQAM transmitter may be based on the inverse discrete Fourier transform (IDFT). Such a transmitter and structures (e.g. those based on IDFT) may also be used for OFDM (e.g. as a special case).

In another embodiment, efficient structures of an OFDM-OQAM receiver may be be based on IDFT or discrete Fourier transform (DFT). For example, due to the equivalence between an OFDM-OQAM transmit signal and an exponentially modulated filter bank (EMFB) transmit signal, EMFB receivers that may be based on a cosine modulated filter bank (CMFB) and sine modulated filter bank (SMFB) may also be used for OFDM-OQAM. Such a structure and receiver may be different from current DFT-based structures of an OFDM receiver.

Figure 1A:
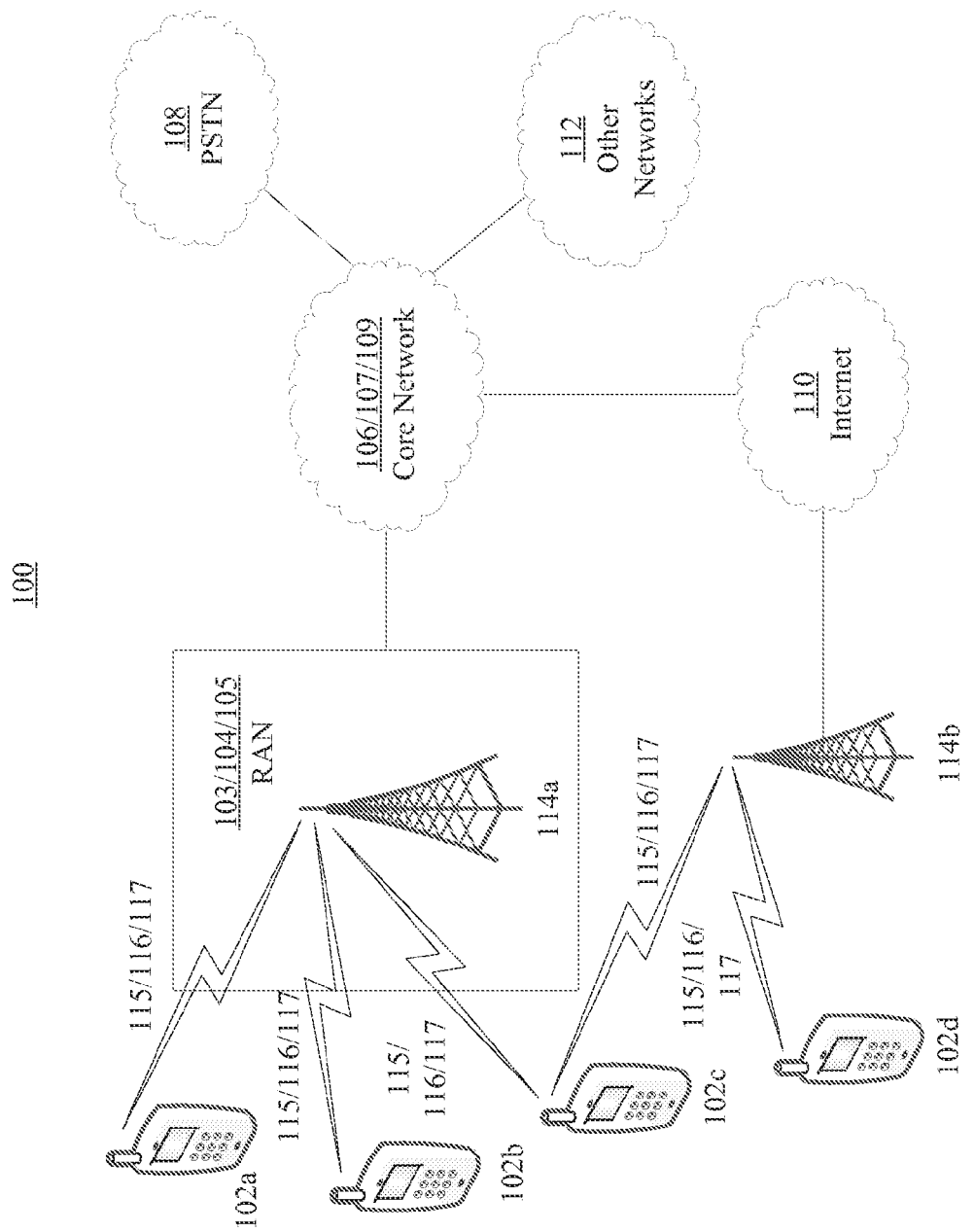
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/ 105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/ 117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
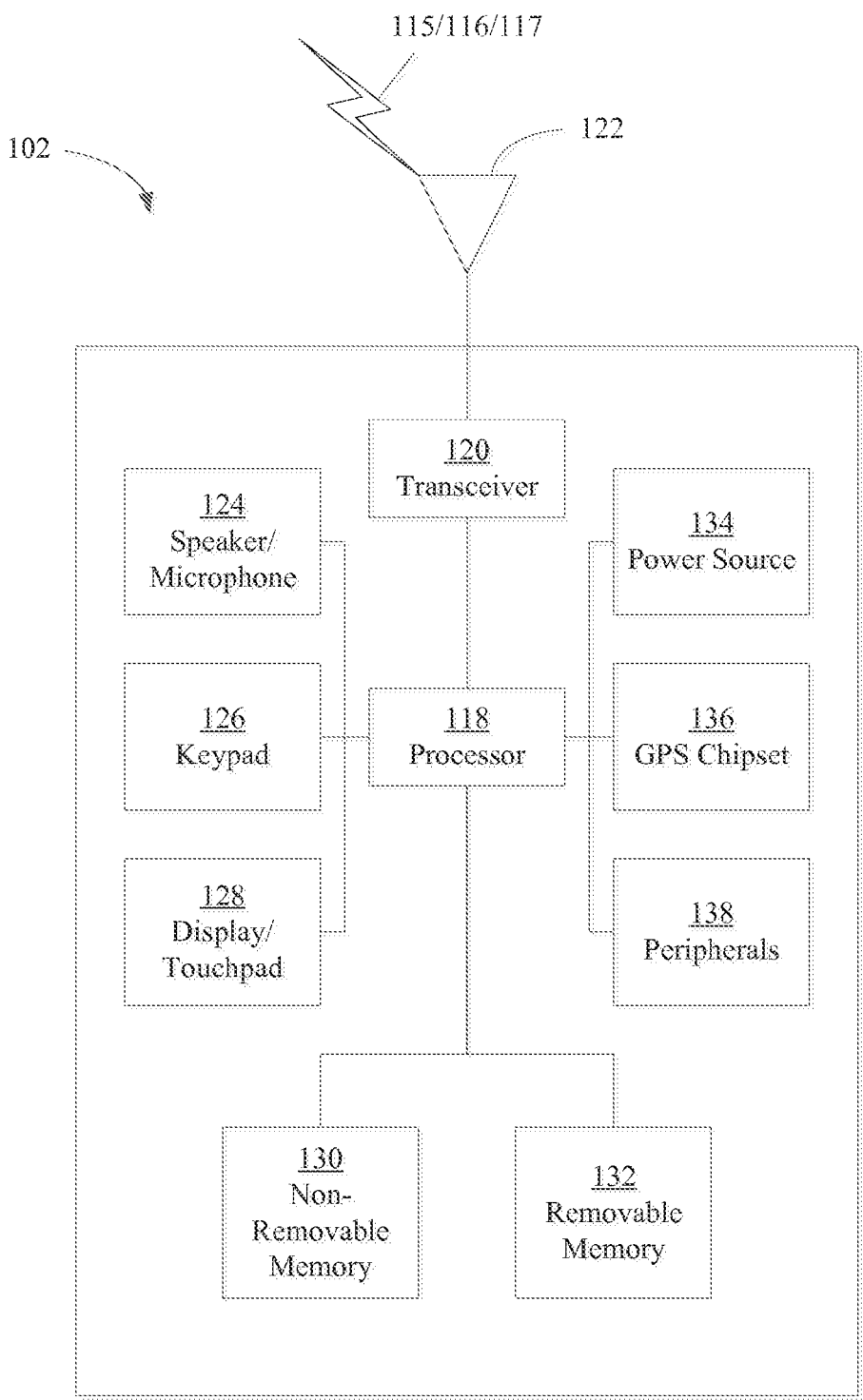
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
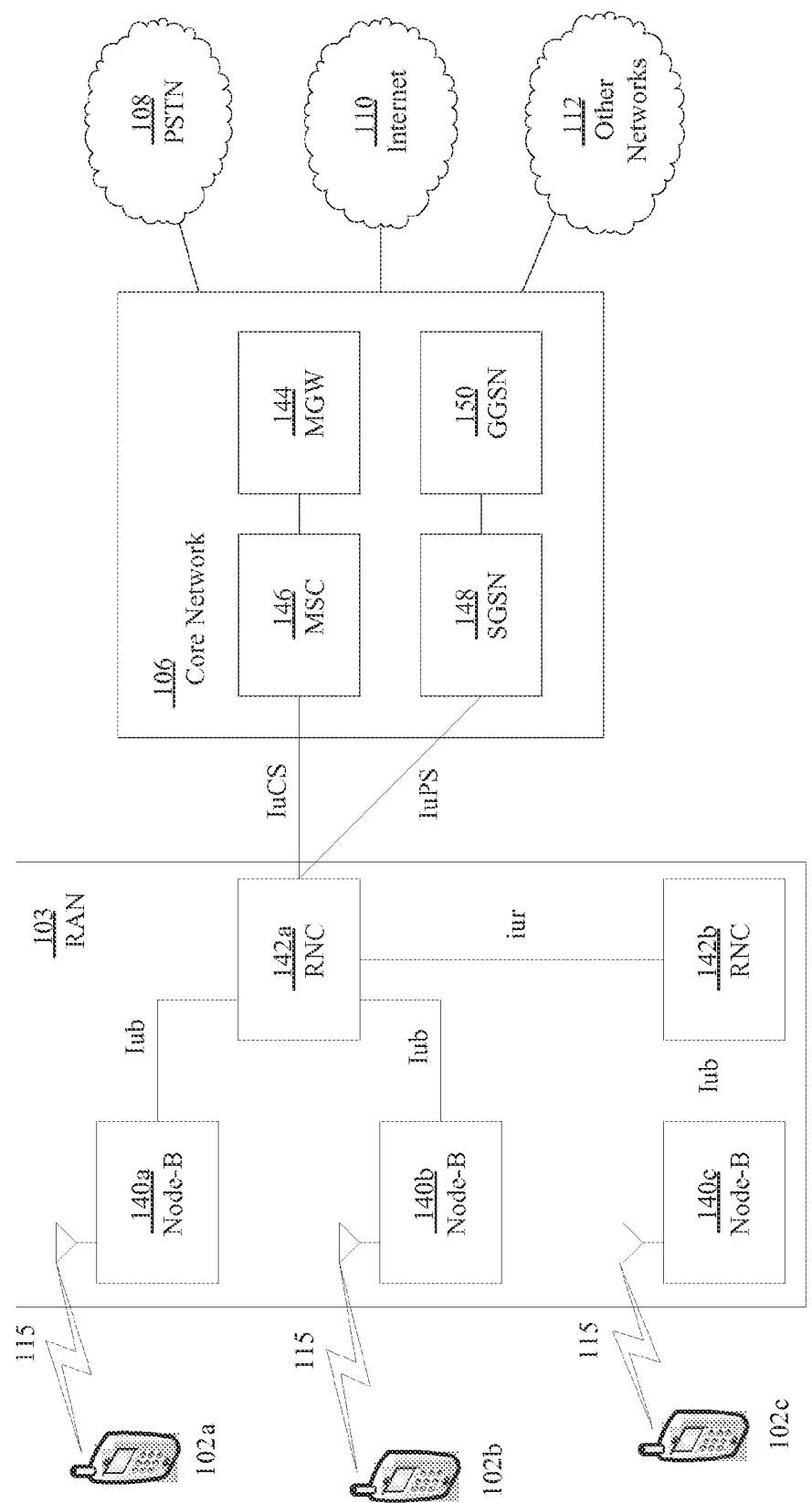
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
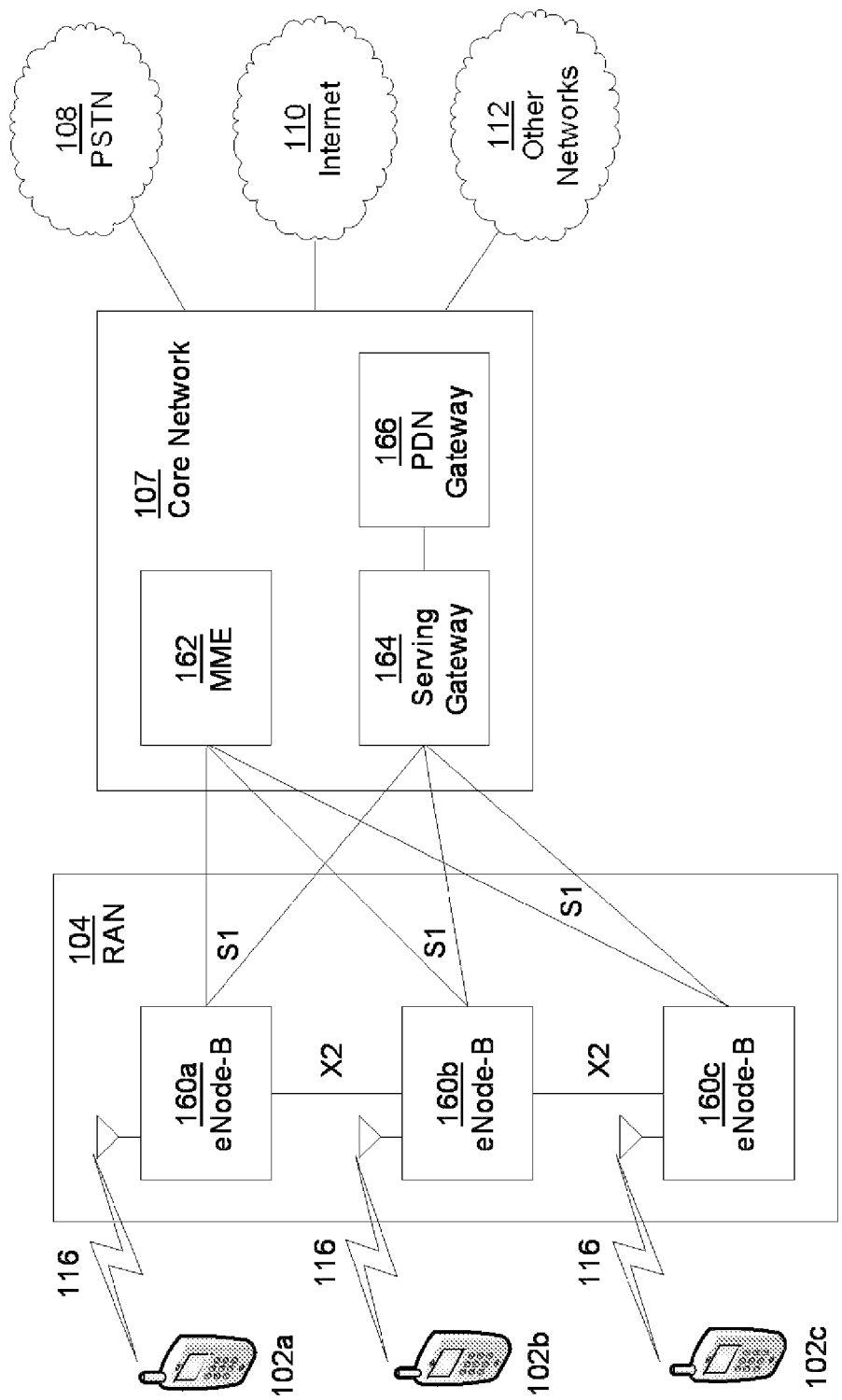
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
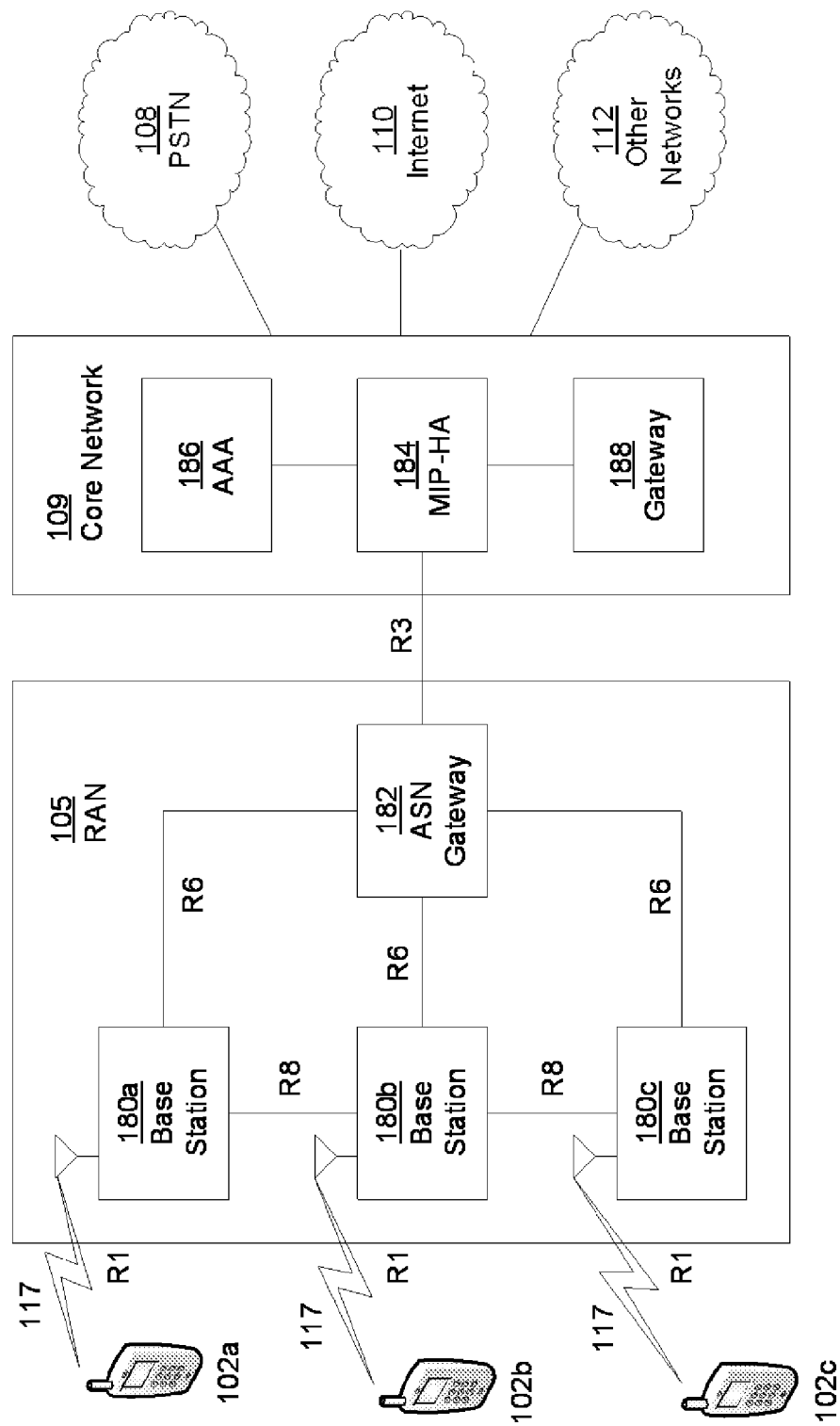
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

OFDM-OQAM in a continuous time model and/or in a discrete time model and/or various structures associated with OFDM-OQAM may be provided. For example, M-Channel OFDM-OQAM in continuous time may be provided. Such an M-Channel OFDM-OQAM in continuous time may provide, use, or include one or more of the following. A real and/or imaginary part of the complex symbols may be transmitted via offset OQAM modulation. In each sub-channel, a real and/or imaginary part of the input symbols may be transmitted in an alternating fashion (e.g. with a half symbol duration between adjacent ones) such as real, imaginary, real, imaginary, and the like. Additionally, a real and symmetric square-root Nyquist filter may be used the filter to help eliminate inter-symbol interference (ISI). Such a filter may also have a roll-off factor that may be no greater than 1, such that that interference to subcarriers beyond its adjacent subcarrier may be reduced or negligible. The OFDM-OQAM structure in such an embodiment may further have a difference of $$\frac{\pi}{2}$$

phase shift between adjacent subcarriers such that adjacent subcarrier interference may be reduced or eliminated.

According to an example embodiment, derivations in an even stacking M-channel OFDM-OQAM in continuous time may be provided and/or used. For example, a perfect reconstruction (PR) condition assuming an ideal channel and the relevant assumptions may be given along with sensitivity in terms of ISI and ICI.

In such an embodiment, OFDM-OQAM may use a filter (e.g. a prototype filter) that may satisfy certain assumptions to eliminate or reduce ISI and ICI. For example, such assumptions for OFDM-OQAM may be provided as described herein.

Figure 2:
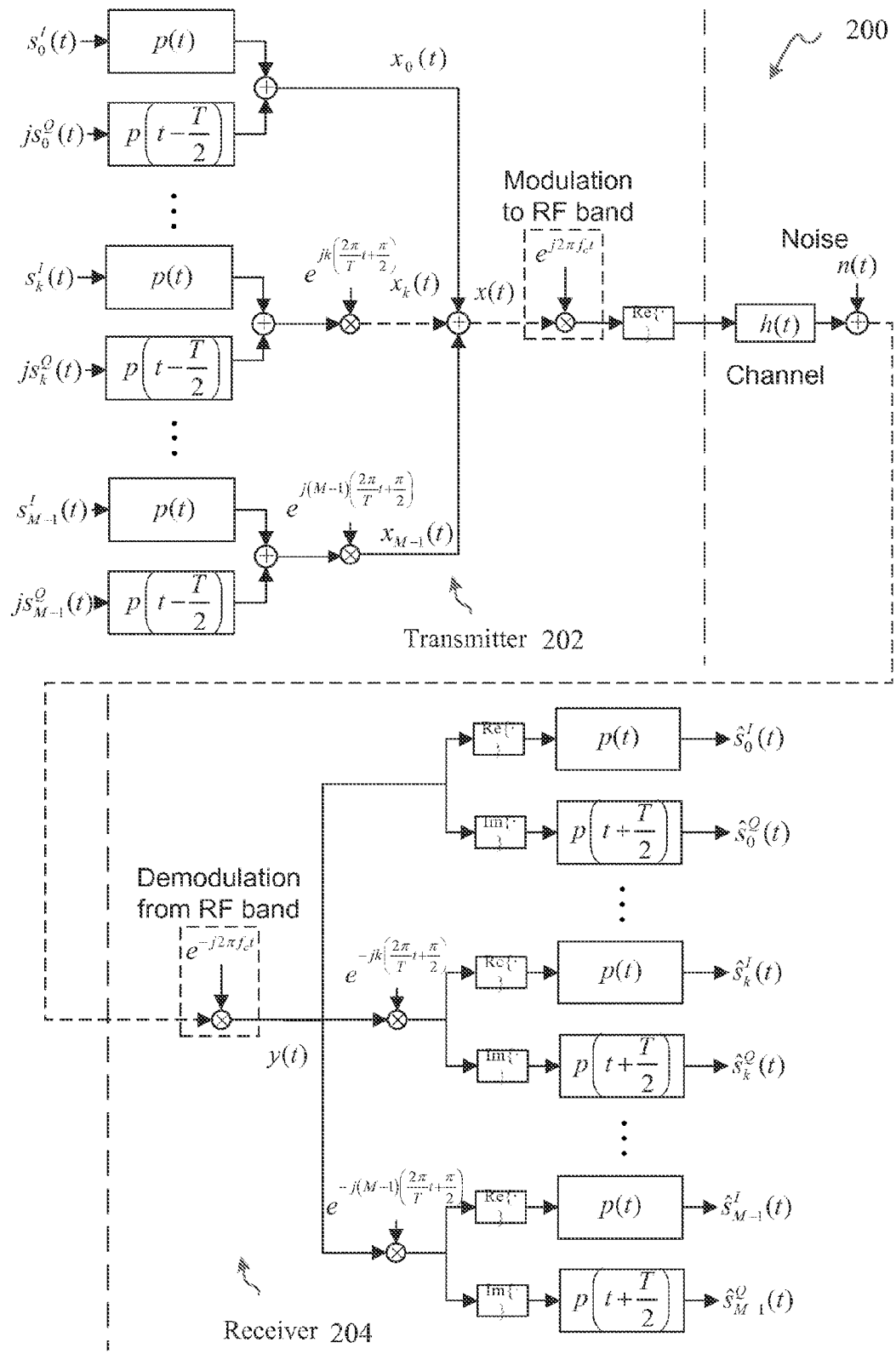
FIG. 2 depicts an example embodiment of a block diagram for an OFDM-OQAM transmitter and receiver.

In OFDM-OQAM, a receiver may use a real prototype filter $p_R(t)$ that may be matched to the real transmit prototype filter $p_T(t)=p(t)$ (e.g. this may be Assumption 1). FIG. 2 illustrates an example embodiment of a continuous-time M-channel OFDM-OQAM transmission system 200 (e.g. based on Assumption 1), which may include a transmitter 202 and a receiver 204. As shown in FIG. 2, the transmitter 202 and/or receiver 204 may use the a real prototype filter $p_R(t)$ that may be matched to the real transmit prototype filter $p_T(t)=p(t)$.

According to an example embodiment, a QAM input symbol (e.g. as shown in FIG. 2) may be represented as $$s_k[n]=s_k^I[n]+js_k^Q[n] \quad (1)$$

where $j=\sqrt{-1}$, and $s_k^I[n]$ and $s_k^Q[n]$ may be the real and imaginary parts of the $n^{th}$ symbol in the $k^{th}$ subcarrier, respectively. As such, the continuous-time input signals to the transmitter (e.g. 202), $s_k^I(t)$ and $s_k^Q(t)$, may be $$s_k^I(t)=\sum_n s_k^I[n]\delta(t-nT) \quad (2)$$

$$s_k^Q(t)=\sum_n s_k^Q[n]\delta(t-nT) \quad (3)$$

where $\delta(t)$ may be the Dirac delta function.

A filter such as prototype filter may also satisfy one or more of the following (e.g. this may be Assumption 2). The prototype filter may be continuous and/or casual with finite support for $T_p>0$, i.e., $$p(t)=0, t<0 \text{ and } t>T_p \quad (4)$$

real, i.e., $$p^H(t)=p(t) \quad (5)$$

and symmetric $$p(T_p-t)=p(t). \quad (6)$$

To go with a casual prototype filter, a time shift of $$\frac{T_p}{2}$$

may be introduced to the subcarrier modulation (not shown in FIG. 2). The complex-valued baseband OFDM-OQAM modulated signal may be defined (e.g. a shown in FIG. 2) as $$x(t) = \sum_{k=0}^{M-1} x_k(t) \quad (7)$$

where $$x_k(t) = \left(s_k^I(t) * p(t) + j s_k^Q(t) * p\left(t - \frac{T}{2}\right)\right) e^{jk\left(\frac{2\pi}{T}\left(t - \frac{T_p}{2}\right) + \frac{\pi}{2}\right)} \quad (8)$$

To combine $$e^{j\frac{\pi}{2}k} = j^k$$

in the processing before the subcarrier modulation, and to combine the subcarrier modulation with the prototype filter (e.g. after some manipulations), (8) may become $$x_k(t) = j^k \left[\sum_n s_k^I[n]\delta(t - nT) + \right. \quad (9)$$

$$\left. j(-1)^k \sum_n s_k^Q[n]\delta\left(t - nT - \frac{T}{2}\right)\right] *$$

$$\left[p(t) e^{j\frac{2\pi k}{T}\left(t - \frac{T_p}{2}\right)}\right]$$

$$= j^k \left[\sum_n j^{2n}(-1)^n s_k^I[n]\delta\left(t - 2n\frac{T}{2}\right) + \right.$$

$$\left. \sum_n j^{2n+1}(-1)^{k+n} s_k^Q[n]\delta\left(t - (2n+1)\frac{T}{2}\right)\right] * g_k(t)$$

where the synthesis filter for the $k^{th}$ subcarrier may be $$g_k(t) = p(t) e^{j\frac{2\pi k}{T}\left(t - \frac{T_p}{2}\right)}. \quad (10)$$

Using change of variable from 2n to n for $s_k^I[n]$ and from 2n+1 to n for $s_k^Q[n]$, (9) may become $$x_k(t) = \left[\sum_n \theta_{kn} s_k^R[n]\delta\left(t - n\frac{T}{2}\right)\right] * g_k(t) = s_k^O(t) * g_k(t) \quad (11)$$

where $$\theta_{k,n} = j^{k+n} \quad (12)$$

and the continuous time OQAM modulated signal may be $$s_k^O(t) = \sum_n \theta_{k,n} s_k^R[n]\delta\left(t - n\frac{T}{2}\right) \quad (13)$$

with the OQAM modulated sequence $$s_k^O[n] = \theta_{k,n} s_k^R[n] \quad (14)$$

and the real input sequence $$s_k^R[n] = \begin{cases} (-1)^{\frac{n}{2}} s_k^I\left[\frac{n}{2}\right], & n \text{ even} \\ (-1)^{k+\frac{n-1}{2}} s_k^Q\left[\frac{n+1}{2}\right], & n \text{ odd} \end{cases} \quad (15)$$

Since $$(-1)^{\frac{n}{2}} \text{ and } (-1)^{k+\frac{n-1}{2}}$$

may be real and may not change the nature of the OQAM modulation, they may be moved to the definition of $s_k[n]$ in (1). Additionally, since n may be the index of symbols in time domain and k may be the index of subcarriers, the factor $\theta_{k,n}$ may indicate that the adjacent $$\frac{T}{2}\text{-spaced}$$

symbols transmitted in the same subcarrier may have a phase shift of $$\frac{\pi}{2}$$

(e.g. they follow a pattern: real, imaginary, real, imaginary, and so on). The factor also may indicate that the symbols transmitted in adjacent subcarriers and the same time slot may also have a phase shift of $$\frac{\pi}{2}$$

Figure 3:
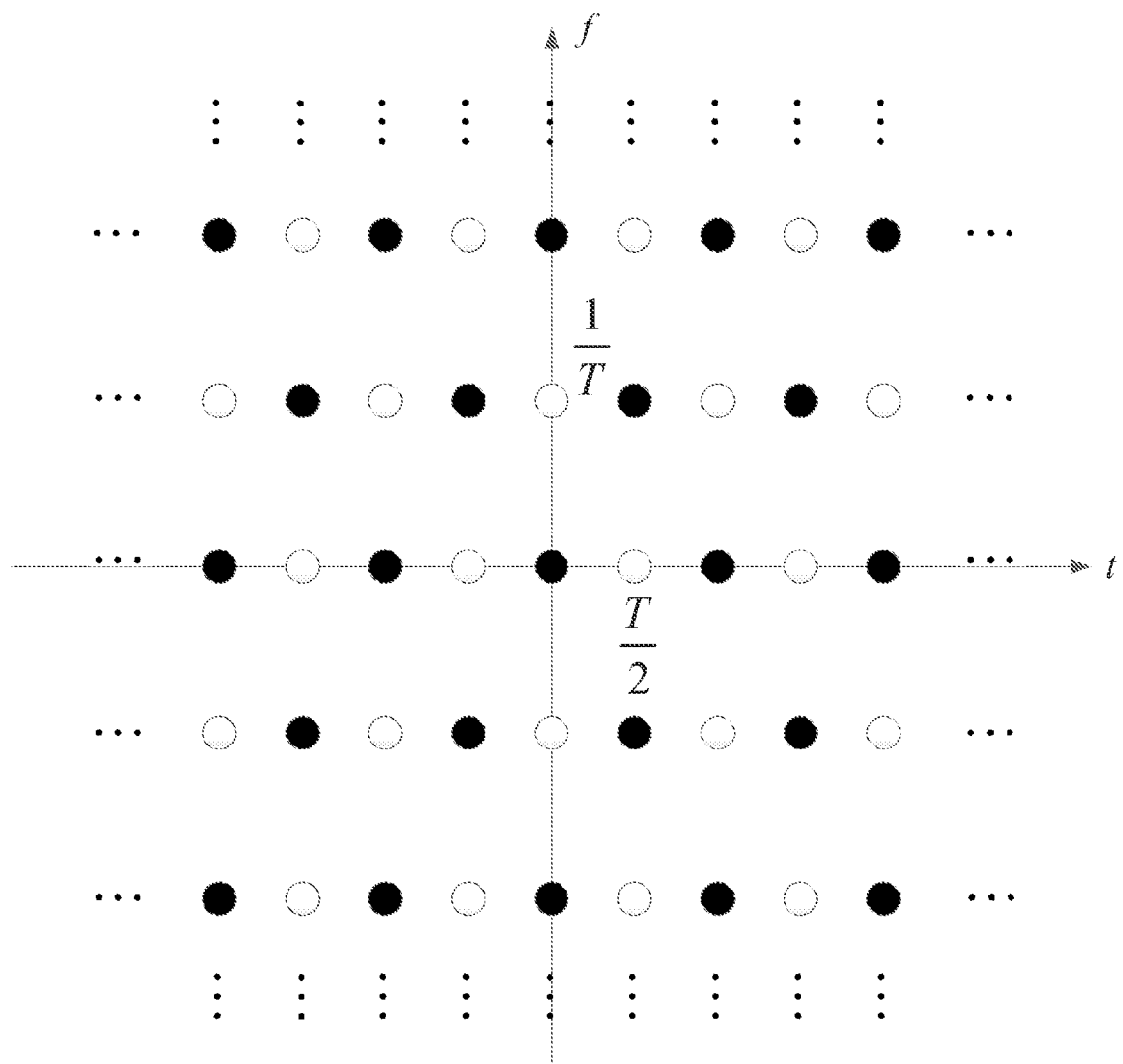
FIG. 3 depicts an example embodiment of a time-frequency phase space for transmission in OFDM-OQAM.

(e.g. they follow the pattern: real, imaginary, real, imaginary, and so on). FIG. 3 illustrates an example embodiment of OFDM-OQAM modulated symbols that may be included in a time-frequency plan where solid points and hollow points may have a phase shift of $$\frac{\pi}{2}.$$

In an embodiment, equations (11) and (13) may be substituted into (7) to obtain a complex-valued baseband OFDM-OQAM modulated signal as $$x(t) = \sum_{k=0}^{M-1} \sum_n \theta_{k,n} s_k^R[n]\delta\left(t - n\frac{T}{2}\right) * g_k(t) = \sum_{k=0}^{M-1} \sum_n \theta_{k,n} s_k^R[n] g_k\left(t - n\frac{T}{2}\right). \quad (16)$$

An additive white Gaussian noise (AWGN) channel may also be used and may be or may include $h(t)=\delta(t)$. At the receiver (e.g. 204), y(t) may be defined as a complex-valued baseband received signal after a delay of $t_D$ to align the synthesis and analysis filters, for example, $$y(t)=[h(t)*x(t)+n(t)]*\delta(t-t_D)=x(t-t_D)+n(t-t_D) \quad (17)$$

The delay may be $t_D=KT-T_p$, where K may be the nearest integer to $$\frac{T_p}{T}.$$

K may also be the overlapping factor and represents the number of symbols prior to the current symbol and the number of symbols after the current symbol may be affected due to the filter. As shown in the receiver (e.g. 204), for the real and imaginary parts, respectively, for the $k^{th}$ subcarrier, the following may be obtained $$\hat{s}_k^I[n] = \Re[z_k(nT)] \quad (18)$$

$$\hat{s}_k^Q[n] = \Im\left[z_k\left(\left(n+\frac{1}{2}\right)T\right)\right] \quad (19)$$

where $\Re[x]$ may take the real part of x and $\Im[x]$ may take the imaginary part of x, and $$z_k(t) = p^H(T_p-t)*\left(y(t)e^{-jk\left(\frac{2\pi}{T}\left(t+\frac{T_p}{2}\right)+\frac{\pi}{2}\right)}\right) = \quad (20)$$
$$p(t)*\left(y(t)e^{-jk\left(\frac{2\pi}{T}\left(t+\frac{T_p}{2}\right)+\frac{\pi}{2}\right)}\right).$$

Additionally (e.g. as shown in FIG. 2), since p(t) may be real, the operations of taking the real and imaginary parts may be applied after the filtering. After OQAM demodulation, the complex symbol sequence for the $k^{th}$ subcarrier may be recovered as $$\hat{s}_k[n]=\hat{s}_k^I[n]+j\hat{s}_k^Q[n]. \quad (21)$$

According to equation (15), an estimated real output sequence may be defined as $$\hat{s}_k^R[n] = \begin{cases} (-1)^{\frac{n}{2}}\hat{s}_k^I\left[\frac{n}{2}\right], & \text{if } n \text{ may be even} \\ (-1)^{k+\frac{n-1}{2}}\hat{s}_k^Q\left[\frac{n+1}{2}\right], & \text{if } n \text{ may be odd} \end{cases} \quad (22)$$

Substituting equation (18) and (19) into (22), the following may be obtained $$\hat{s}_k^R[n] = \begin{cases} (-1)^{\frac{n}{2}}\Re\left[z_k\left(\frac{n}{2}T\right)\right], & \text{if } n \text{ is even} \\ (-1)^{k+\frac{n-1}{2}}\Re\left[-jz_k\left(\frac{n}{2}T\right)\right], & \text{if } n \text{ is odd} \end{cases} \quad (23)$$

In an embodiment, $$e^{-j\frac{2\pi}{T}k\frac{n}{2}T} = (-1)^{kn} \text{ and } e^{-j\frac{\pi}{2}k} = (-j)^k \text{ such that } z_k\left(\frac{n}{2}T\right)$$

in (23) may become $$z_k\left(\frac{n}{2}T\right) = \int_{-\infty}^{\infty} p\left(\frac{n}{2}T-\tau\right)y(\tau)e^{-jk\left(\frac{2\pi}{T}\left(\tau+\frac{T_p}{2}\right)+\frac{\pi}{2}\right)}d\tau \quad (24)$$
$$= (-1)^{kn}\int_{-\infty}^{\infty} p\left(\frac{n}{2}T-\tau\right)y(\tau)e^{jk\left(\frac{2\pi}{T}\left(\frac{n}{2}T-\tau-\frac{T_p}{2}\right)-\frac{\pi}{2}\right)}d\tau$$
$$= (-1)^{kn}y(t)*\left(p(t)e^{jk\left(\frac{2\pi}{T}\left(t-\frac{T_p}{2}\right)-\frac{\pi}{2}\right)}\right)\Big|_{t=\frac{n}{2}T}$$
$$= (-j)^k(-1)^{kn}y(t)*\left(p(t)e^{j\frac{2\pi k}{T}\left(t-\frac{T_p}{2}\right)}\right)\Big|_{t=\frac{n}{2}T}$$
$$= (-j)^k(-1)^{kn}\tilde{z}_k\left(\frac{n}{2}T\right)$$

where $$\tilde{z}_k(t) = y(t)*\left(p(t)e^{j\frac{2\pi k}{T}\left(t-\frac{T_p}{2}\right)}\right) = y(t)*f_k(t). \quad (25)$$

The analysis filter for the kth subcarrier may be $$f_k(t) = p(t)e^{j\frac{2\pi k}{T}\left(t-\frac{T_p}{2}\right)} = g_k(t) \quad (26)$$

which may be the same as the synthesis filter $g_k(t)$. When n may be even, $(-1)^{kn}=1$ and $$(-1)^{kn} = 1 \text{ and } (-j)^n = (-1)^{\frac{n}{2}}, \hat{s}_k^R[n]$$

in equation (23) may become $$\hat{s}_k^R[n] = (-1)^{\frac{n}{2}}\Re\left[z_k\left(\frac{n}{2}T\right)\right] \quad (27)$$
$$= (-1)^{\frac{n}{2}}\Re\left[(-j)^k\tilde{z}_k\left(\frac{n}{2}T\right)\right]$$
$$= (-1)^{\frac{n}{2}}\Re\left[(-j)^{k+n}(-1)^{\frac{n}{2}}\tilde{z}_k\left(\frac{n}{2}T\right)\right]$$
$$= \Re\left[\theta_{k,n}^H\tilde{z}_k\left(\frac{n}{2}T\right)\right].$$

When n may be odd, $$(-1)^{kn} = (-1)^k \text{ and } (-j)^n = -j(-1)^{\frac{n-1}{2}}, \hat{s}_k^R[n]$$

in (23) may become $$\hat{s}_k^R[n] = (-1)^{k+\frac{n-1}{2}}\Re\left[-jz_k\left(\frac{n}{2}T\right)\right] \quad (28)$$
$$= (-1)^{k+\frac{n-1}{2}}\Re\left[(-j)^{k+1}(-1)^k\tilde{z}_k\left(\frac{n}{2}T\right)\right]$$
$$= (-1)^{k+\frac{n-1}{2}}\Re\left[(-j)^{k+n}(-1)^{k+\frac{n-1}{2}}\tilde{z}_k\left(\frac{n}{2}T\right)\right]$$
$$= \Re\left[\theta_{k,n}^H\tilde{z}_k\left(\frac{n}{2}T\right)\right].$$

From equations (27) and (28), the following may be obtained $$\hat{s}_k^R[n] = \Re\left[\theta_{k,n}^H \tilde{z}_k\left(\frac{n}{2}T\right)\right]. \quad (29)$$

In embodiments, $$(-1)^{\frac{n}{2}} \text{ and } (-1)^{k+\frac{n-1}{2}}$$

may be real and may not change the nature of OQAM modulation such that they may be moved to the definition of $s_k[n]$ in (1) and that of $\hat{s}_k[n]$ in equation (21).

According to example embodiments, interference may happen in one or more of the following: possible inter symbol interference (ISI) across successive symbols of either a real or imaginary part of a signal; cross interference between a real and imaginary part of a signal; and inter carrier interference (ICI) among subcarriers. Additionally, a filter such as the prototype filter p(t) may be designed to satisfy certain conditions such that the signal may reconstructed (e.g. may be near perfectly reconstructed). Such prototype filter conditions may be summarized below (e.g. in Theorem 1).

For example, based on the foregoing (e.g. Assumption 1 and Assumption 2), if the prototype filter p(t) may be a root-Nyquist filter, ISI and interference from adjacent subcarriers may be eliminated (e.g. this may be Theorem 1).

In an embodiment (e.g. based on or in Theorem 1), ICI may exist from some of the non-adjacent subcarriers (i.e. subcarriers that may be more than one subcarrier spacing away).

Additionally, in an embodiment (e.g. which may be Assumption 3), to simplify the design or reduce the complexity of p(t), adjacent subcarrier bands may overlap. Furthermore, there may be ICI from subcarriers beyond adjacent channels that may be accounted for as "background noise."

The roll off factor of p(t) may be smaller than one in an embodiment. Thus, at a receiver (e.g. 204), the interference term from the carriers which are more than one carrier spacing away may be negligible.

Additionally (e.g. based on or under Assumption 1 and Assumption 2), the interference between the real and imaginary $s_k^O[n]$ (e.g. shown in FIG. 2) may be 0 (e.g. this may be Theorem 2). Such an embodiment (e.g. Theorem 2) may be the basis for OQAM modulation.

According to an example embodiment, M-Channel OFDM-OQAM in discrete time may be provided. In such an M-Channel OFDM-OQAM, sampling may be provided and/ or used. For example, a sampling rate may be $$f_s = \frac{1}{T_s} \text{ where } T_s = \frac{T}{L}$$

and L may be an integer and L≥M. The number of samples per symbol duration, L, may be chosen (e.g. may usually be chosen) as a power of 2 for fast implementation. If L=M, a system such as a communication system (e.g. 100 shown in FIGS. 1A-1E) may be critically sampled (CS), i.e., sampling may be at a Nyquist rate. Otherwise, if L>M, the system may be oversampled (OS), i.e., sampling may be at a higher rate than a Nyquist rate.

The structure of the M-channel OFDM-OQAM described herein may be based on L-point discrete Fourier transform (DFT)/inverse discrete Fourier transform (IDFT). In an embodiment, if L>M, zeros may be padded to the L-point IDFT at the synthesis filter bank (SFB) and the L−M irrelevant outputs from the L-point DFT or IDFT at the analysis filter bank (AFB) may be discarded. In such an embodiment, after sampling, the sample sequences may become $$s_{k,L}^I[n] = \sum_l s_k^I[l]\delta[n-lL]; \text{ and} \quad (30)$$

$$s_{k,L}^Q[n] = \sum_l s_k^Q[l]\delta[n-lL]. \quad (31)$$

In an example, the foregoing (e.g. equations (30) and (31)) may be an upsampled sequence of the symbol sequences $s_k^I[n]$ and $s_k^Q[n]$, respectively by L. The OQAM modulated sample sequence may then become $$s_{k,\frac{L}{2}}^O[n] = \sum_l s_k^O[l]\delta\left[n-l\frac{L}{2}\right] = \sum_l \theta_{k,l} s_k^R[l]\delta\left[n-l\frac{L}{2}\right] \quad (32)$$

where the OQAM modulated sequence $s_k^O[l]$, real input sequence $s_k^R[l]$, and $\theta_{k,l}$, respectively, may be defined in equations (14), (15), and (12). Such an embodiment (e.g. shown in equation 32) may be the upsampled sequence of the sequence $$s_k^O[l] \text{ by } \frac{L}{2}.$$

Additionally, the prototype filter may be of length $L_p$ samples, i.e., $T_p=(L_p-1)T_s$. In an embodiment, $L_p$ may be an arbitrary number since it may not be greater than L. According to example embodiments, $L_p$ may be chosen such that $L_p>L$. Based on the foregoing, the synthesis and analysis filter for the kth subcarrier may become $$g_k[n] = f_k[n] = p[n]\exp\left[j\frac{2\pi k}{L}\left(n-\frac{L_p-1}{2}\right)\right] = p[n]\beta_k W_L^{-kn}, \quad (33)$$

$$k = 0, \ldots, M-1$$

where $$\beta_k = \exp\left[-j\frac{2\pi k}{L}\left(\frac{L_p-1}{2}\right)\right] = W_L^{k\left(\frac{L_p-1}{2}\right)} \quad (34)$$

due, for example, to shift of the center of the filters $$\frac{L_p-1}{2},$$

and $$W_L = e^{-j\frac{2\pi}{L}}.\quad(35)$$

After sampling, the number of samples in a delay may be $$D = \frac{t_D}{T_s} = \frac{KT - t_p}{T_s} = KL - (L_p - 1) = KL + 1 - L_p.\quad(36)$$

Figure 4:
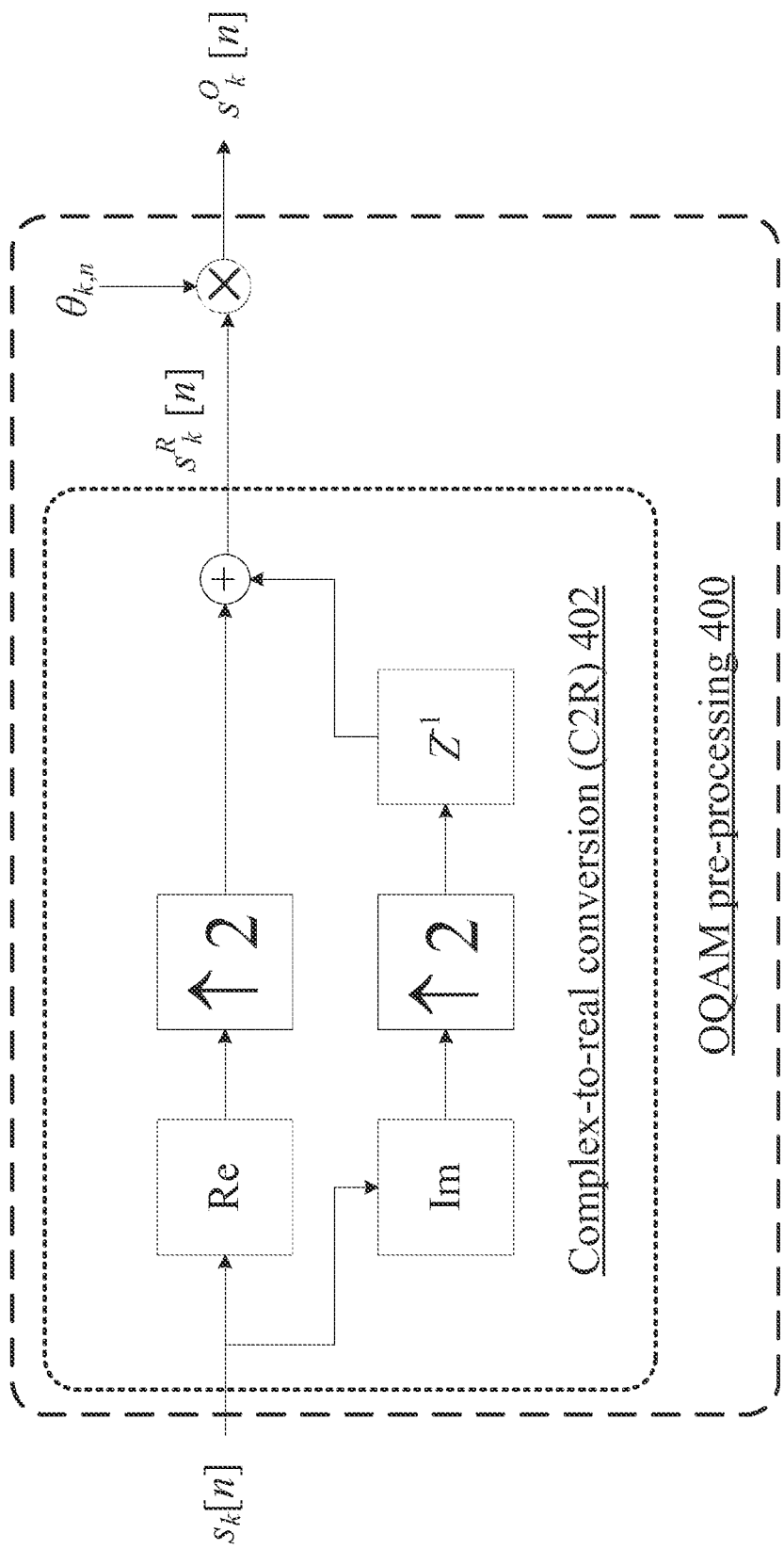
FIG. 4 depicts an example embodiment of OQAM pre-processing.
Figure 5:
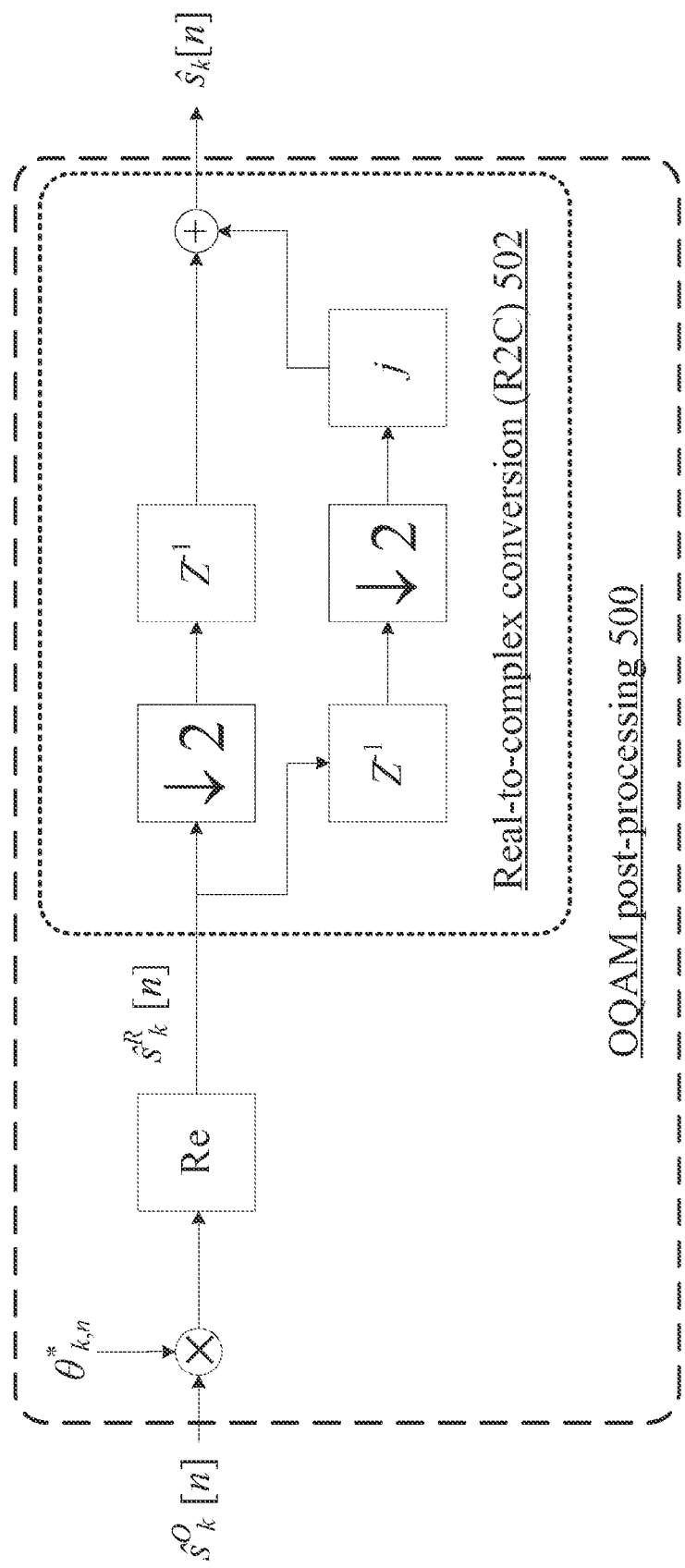
FIG. 5 depicts an example embodiment of OQAM post-processing

OQAM pre-preprocessing and/or post-processing as described herein may be provided or used. For example, when $$(-1)^{\frac{n}{2}} \text{ and } (-1)^{k+\frac{n-1}{2}}$$

may be used in the definition of $s_k[n]$ shown in (1) and that of $\hat{s}_k[n]$ shown in (21), OQAM pre-processing (e.g. OQAM pre-processing 400 that may include a complex-to-real conversion (C2R) 402) and post-processing (e.g. OQAM post-processing 500 that may include a real-to-complex conversion (R2C) 502), respectively, may be depicted as shown in FIG. 4 and FIG. 5. Additionally, the OQAM pre-processing (e.g. OQAM pre-processing 400 shown in FIG. 4) and post-processing (e.g. OQAM post-processing 500 shown in FIG. 5) of the odd indexed subcarriers may be different from that of the even indexed subcarriers due to different complex-to-real and real-to-complex mapping definitions (e.g. a synthesis filter bank (SFB) 600 shown in FIG. 6 and an analysis filter bank (AFB) 700 shown in FIG. 7).

In an embodiment, the OQAM pre-processing and/or post-processing that may be provided or used may have a complexity associated therewith. To identify and/or determine the complexity, the number of real multiplications may be used (e.g. for simplicity). Additionally, such multiplications may be based on or may include multipliers in OQAM pre-processing (or respectfully post-processing) such as $\theta_{k,n} = j^{k+n}$ (or respectfully $\theta_{k,n}^H$). In an embodiment, the sign of each multiplier may not matter but the pattern of alternation of real and imaginary may matter (e.g. in complexity or other properties). According to an example embodiment, The OQAM pre-processing and post-processing may be considered multiplication-free since ±1 and ±j may be trivial multiplications.

A channel and delay may also be provided as described herein. For example, before an analysis filter bank may be applied, an ideal channel H(z)=1, noise N(z)=0, and a delay of D=KL+1-$L_p$ samples may be provided such that $$Y(z) = z^{-D}H(z)X(z) = z^{-D}X(z).\quad(37)$$

A delay may be present or provided when a prototype filter may have a length $L_p$=KL+1-D. Such a delay may be present or provide because that the synthesis filters and the analysis filters may need to be aligned when convolution may be applied to each of them. In a discrete time domain, the operation may include or may be $$y[n] = x[n-D].\quad(38)$$

In an embodiment, an efficient structure of the OFDM-OQAM the may be designed and/or provided as described herein may be used when non-ideal channels may be present. Other components, such as an equalizer, may further be provided, designed, and/or developed to mitigate distortion.

An example of an efficient structure may include a critically sampled (CS) M-Channel OFDM-OQAM. According to an example embodiment, the sampling rate of the critically sampled (CS) M-channel OFDM-OQAM may be $$f_s = \frac{1}{T_s}, \text{ where } T_s = \frac{T}{L},$$

with L=M. The IDFT-based synthesis filter bank (SFB) and DFT-based analysis filter bank (AFB) of efficient polyphase structure may be depicted in FIG. 6 and FIG. 7 (e.g. as SFB 600 and AFB 700), respectively. An equivalent IDFT-based AFB may also be provided and/or used.

The length-$L_p$ prototype filter p[n] may be real and symmetric (e.g. it may satisfy $p[n]=p^H[n]$ and $p[n]=p[L_p-1-n]$). The length $L_p$ may be usually close to KL where K may be an overlapping factor. In an embodiment, $L_p$=KL−1, $L_p$=KL, and $L_p$=KL+1 may be considered and compared. Additionally, in an embodiment, $L_p$=KL+1 may be provided and/or used. Each of the foregoing may result in a similar or the same latency, for example, due to a delay D=KL+1−$L_p$ to align the synthesis and analysis filters (e.g. associated with the SFB 600 and AFB 700 shown in FIGS. 6 and 7). The synthesis and analysis filters in Table 1 below may be used according to an example embodiment.

TABLE 1

Synthesis and analysis filters in OFDM-OQAM

| | Synthesis filter $g_k[n]$ | Analysis filter $f_k[n]$ |
|---|---|---|
| M-channel OFDM-OQAM | $g_k[n] = p[n]\exp\left[j\frac{2\pi k}{L}\left(n - \frac{L_p-1}{2}\right)\right]$, $k = 0, \ldots, M-1$ | $f_k[n] = g_k[n]$ |

Figure 6:
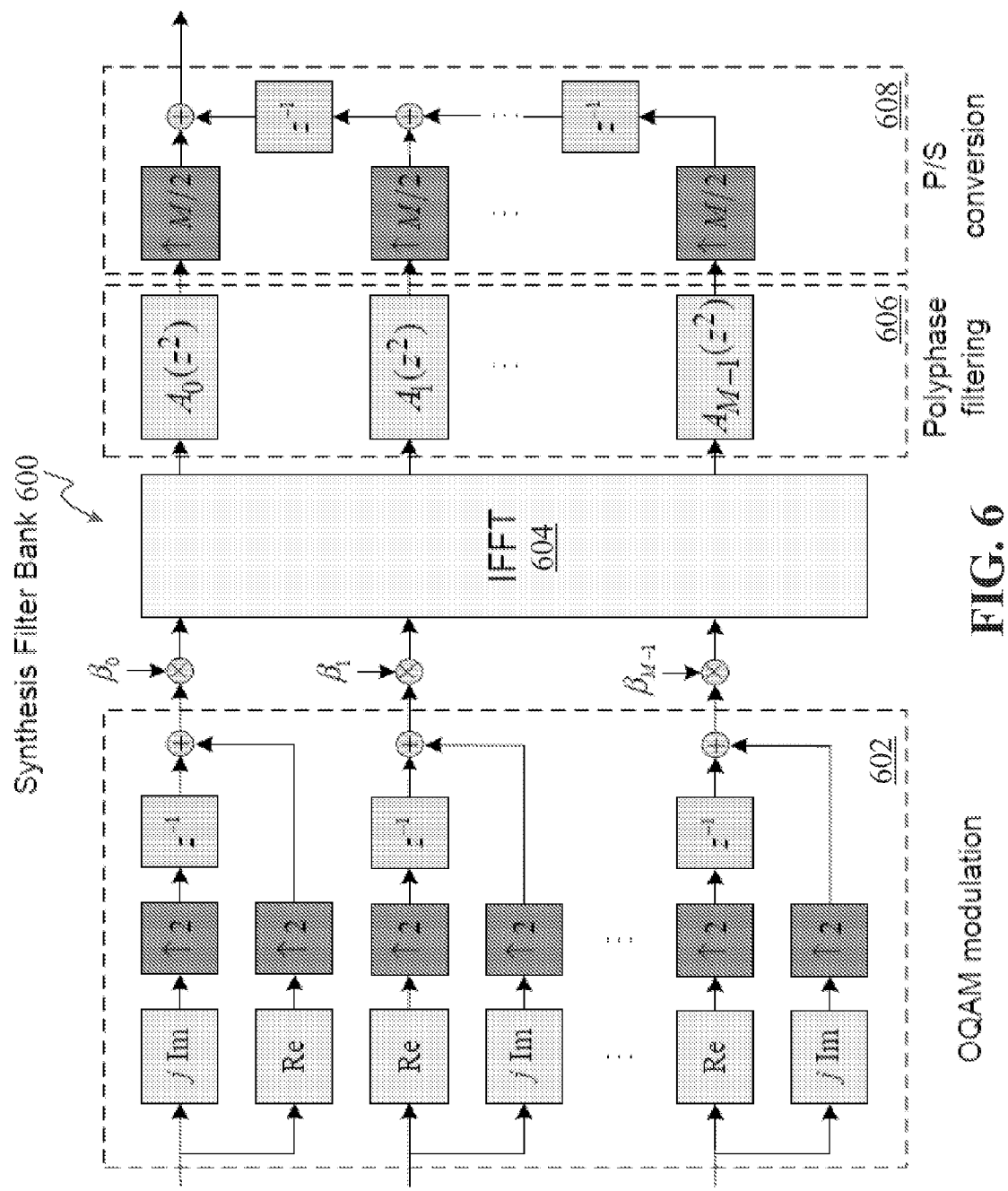
FIG. 6 depicts an example embodiment of a polyphase structure of a synthesis filter bank (SFB) in M-channel OFDM-OQAM.

For example, an example of an efficient structure may include a synthesis filter bank (SFB). FIG. 6 illustrates an example embodiment of a SFB 600 that may be provided or used herein. The IDFT-based SFB 600 shown in FIG. 6 may be backward compatible to OFDM (e.g. since it uses IDFT). As shown, the SFB 600 may include an OQAM modulation component 602, an IFFT component 604, a polyphase filtering component 606, and/or a parallel-to-serial (P/S) conversion component 608. The SFB 600 may receive one or more inputs that may be modulated with the OQAM modulation component 602. The output of the OQAM modulation component 602 may be multiplied (e.g. by β) and the multiplication thereof may be provided as input to the IFFT component 604 where an IFFT may be performed. The output of the IFFT component 604 may be received by the polyphase filtering component 606 and, after performing polyphase filtering, by the P/S conversion component 608 such that the output of the SFB 600 may be provided after P/S conversion via the P/S conversion component 608.

In FIG. 6, $$\beta_k = e^{-j\frac{\pi k}{M}(L_p-1)}\quad(39)$$

where k may be the subcarrier index. The polyphase filters may be $$a_q[b] = p[q+bM], q=0,1,\ldots,M-1, b=0,1,\ldots,K-1\quad(40)$$

and their Z-transforms may be $$A_q(z) = \sum_{b=0}^{K-1} p[q+bM]z^{-b}, q = 0, 1, \ldots, M-1. \quad (41)$$

In an embodiment, when $L_p=KM+1$, $\beta_k=(-1)^{kK}$, the number of multiplications of the SFB may be reduced.

Figure 7:
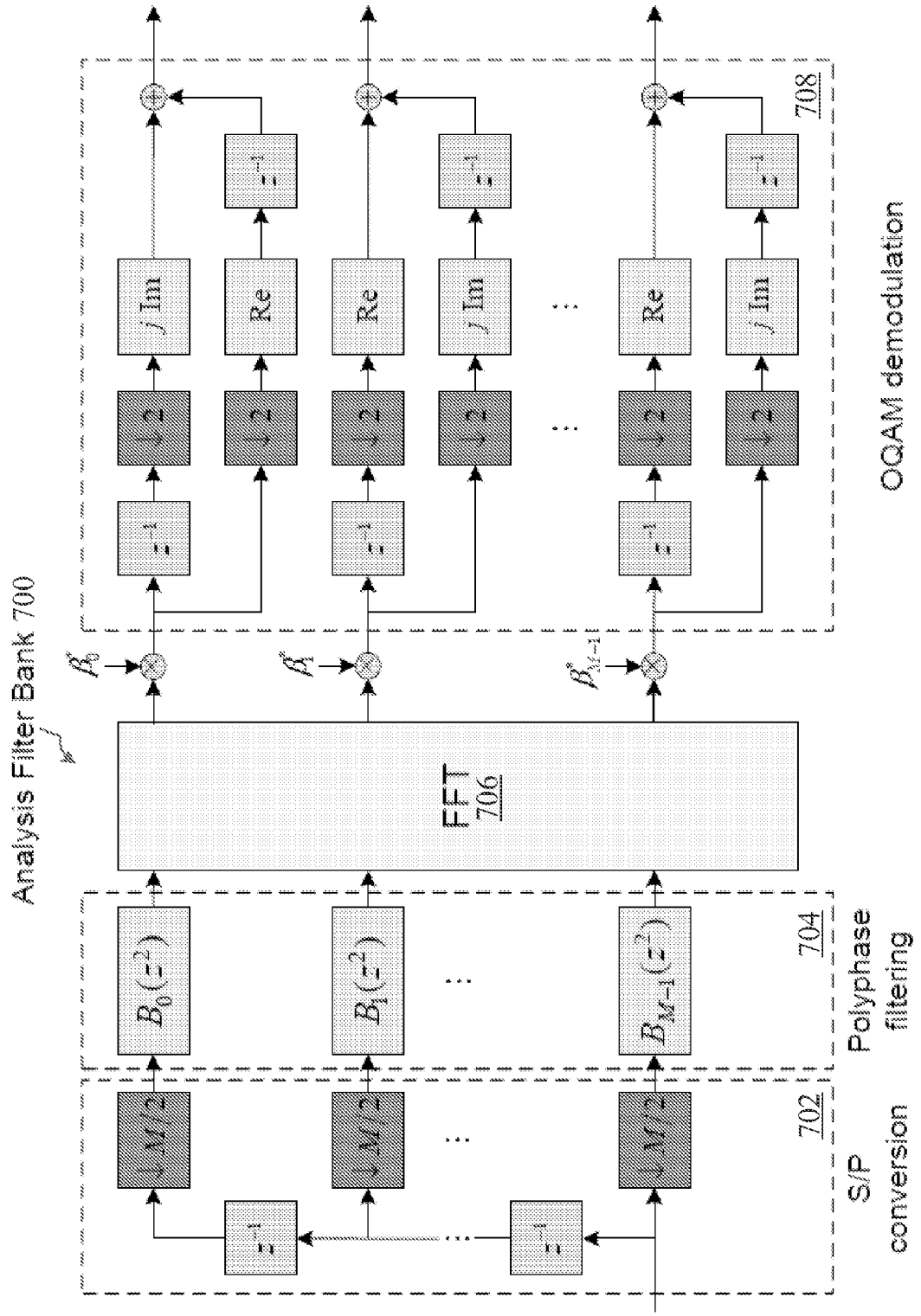
FIG. 7 depicts an example embodiment of a DFT-based polyphase structure of an analysis filter bank (AFB) in M-channel OFDM-OQAM.

An example of an efficient structure may include an analysis filter bank (AFB). FIG. 7 illustrates an example embodiment of an AFB 700 that may be provided or used herein. The DFT-based AFB 700 in FIG. 7 may be backward compatible to OFDM. As shown, the AFB 700 may include a serial-to-parallel (S/P) conversion component 702, a polyphase filtering component 704, an FFT component 706, and/or an OQAM demodulation component 708. The AFB 700 may receive an input that may be converted serial-to-parallel with the S/P conversion component 702. The output of the S/P conversion component 702 may be received by the polyphase filtering component 704. After performing polyphase filtering, FFT may be performed on the output by the FFT component 706. The output of the FFT modulation component 602 may then be multiplied (e.g. by β* or β̂) and the multiplication thereof may be provided as input to the OQAM demodulation component 708 where OQAM demodulation may be performed. One or more outputs of the AFB 700 may be provided after demodulation via the OQAM demodulation component 708.

In FIG. 7, $$\hat{\beta}_k = e^{-j\frac{\pi k}{M}(L_p+1)} \quad (42)$$

The polyphase filters may be $$b_q[b]=a_{M-1-q}[b], q=0,1,\ldots,M-1 \quad (43)$$

and their Z-transforms may be $$B_q(z)=A_{M-1-q}(z), q=0,1,\ldots,M-1. \quad (44)$$

When $L_p=KM-1$, $\hat{\beta}_k=(-1)^{kK}$, the number of multiplications of the AFB may be reduced. In an embodiment, the AFB may also be implemented using IDFT (e.g. instead of DFT). The IDFT-based AFB may have $\beta_k$ multipliers in (39) instead of $\hat{\beta}_k$ multipliers in (42). In such an embodiment, when $L_p=KM+1$, the number of multiplications of the AFB may also be reduced. However, the IDFT-based AFB may not backward compatible to OFDM. As such, the DFT-based AFB as shown in FIG. 7 may be provided or used for backward compatibility to OFDM.

In an embodiment, the foregoing structures that may be provided (e.g. SFB 600 and/or AFB 700) may have a complexity associated therewith. The number of real multiplications of an M-point IFFT with M complex (respectively for real and imaginary such as purely real and imaginary) inputs may be $\mu_{IFFT}^C(M,M)=M \log_2 M-3M+4$ (e.g. respectively $$\left(\text{e.g. respectively } \mu_{IFFT}^{R/I}(M,M) = \frac{M}{2}\log_2\frac{M}{2} - 3\frac{M}{2} + 4 = \frac{M}{2}\log_2 M - 2M + 4\right). \quad$$

Additionally, according to an example embodiment, the numbers of real multiplications for each of the M QAM symbols in the OFDM SFB and AFB (e.g. 600 and 700), respectively, may be $$\mu_{OFDM,SFB}(M,M)=\mu_{OFDM,AFB}(M,M)=\mu_{IFFT}^C(M,M)=M\log_2 M-3M+4. \quad (45)$$

Based on the foregoing, the total number of real multiplications for each of the M QAM symbols in OFDM may be $$\mu_{OFDM}(M,M)=\mu_{OFDM,SFB}(M,M)+\mu_{OFDM,AFB}(M,M)=2M\log_2 M-6M+8. \quad (46)$$

The complexity of the efficient structure of CS OFDM-OQAM (where L=M) SFB and AFB (e.g. 600 and 700), respectively, may be analyzed for a general $L_p$. The number of real multiplications for each of the (or every) M QAM symbols (equivalently, 2M OQAM symbols) may be $$\begin{aligned}\mu_{OFDM\text{-}OQAM,SFB}(M,M,L_p) &= \mu_{OFDM\text{-}OQAM,AFB}(M,M,L_p) \quad (47)\\ &= 2(2M + \mu_{IFFT}^C(M,M) + 2L_p)\\ &= 2(2M + M\log_2 M - 3M + 4 + 2L_p)\\ &= 2M\log_2 M - 2M + 4L_p + 8.\end{aligned}$$

As such, the total number of real multiplications for each of the (or every) M QAM symbols in OFDM may be $$\begin{aligned}\mu_{OFDM\text{-}OQAM}(M,M,L_p) &= \mu_{OFDM\text{-}OQAM,SFB}(M,M,L_p) + \quad (48)\\ &\quad \mu_{OFDM\text{-}OQAM,AFB}(M,M,L_p) =\\ &= 4M\log_2 M - 4M + 8L_p + 16.\end{aligned}$$

The complexity of the efficient structure of CS OFDM-OQAM (where L=M) SFB and AFB (e.g. 600 and 700), respectively, may be analyzed (e.g. for the special case) when $L_p=KL+1$. The number of real multiplications of the SFB (e.g. 600) for each of the M QAM symbols (equivalently, 2M OQAM symbols) may be $$\begin{aligned}\mu_{OFDM\text{-}OQAM,SFB,L_p\,odd}(M,M,L_p) &= 2(\mu_{IFFT}^{R/I}(M,M) + 2L_p) \quad (49)\\ &= 2\left(\frac{M}{2}\log_2 M - 2M + 4\right) +\\ &\quad 4(KM+1)\\ &= M\log_2 M + 4(K-1)M +\\ &\quad 12\end{aligned}$$

and that of the AFB (e.g. 700) may be the same as in equation (47). As such, the total number of real multiplications for each of the M QAM symbols in OFDM-OQAM may be $$\begin{aligned}\mu_{OFDM\text{-}OQAM,L_p\,odd}(M,M,L_p) &= \mu_{OFDM\text{-}OQAM,SFB,L_p\,odd}(M,M,L_p) + \\ &\quad \mu_{OFDM\text{-}OQAM,AFB}(M,M,L_p) = \quad (50)\\ &= (M\log_2 M + 4(K-1)M + 12) +\\ &\quad (2M\log_2 M - 2M + 4(KM+1) + 8)\\ &= 3M\log_2 M + (8K-6)M + 24.\end{aligned}$$

In an embodiment, an oversampled (OS) OFDM-OQAM may also be provided or used. For example, a structure (e.g. an efficient structure) of the N-channel OS OFDM-OQAM may be provided or used. In such an embodiment, the sampling rate may be $$f_s = \frac{1}{T_s}, \text{ where } T_s = \frac{T}{L},$$

with L being an integer and L≥M. L may be (e.g. may be chosen as) a power of 2. If L=M, the system such as the communication system shown in FIGS. 1A-1E may be critically sampled (CS). Otherwise, if L>M, the system may be oversampled (OS). In an embodiment, if L>M, zeros may be padded to a L-point IDFT (e.g. L-point IDFT 902) at a synthesis filter bank (SFB) (e.g. SFB 900 shown in FIG. 9) and the L−M irrelevant outputs from a L-point DFT or IDFT (e.g. L-point IDFT 1102) at an analysis filter bank (AFB) (e.g. AFB 1100 shown in FIG. 11) may be discarded (e.g. the output marked by stars). Additionally, in an embodiment, the center of the filters may not be clear.

Figure 8:
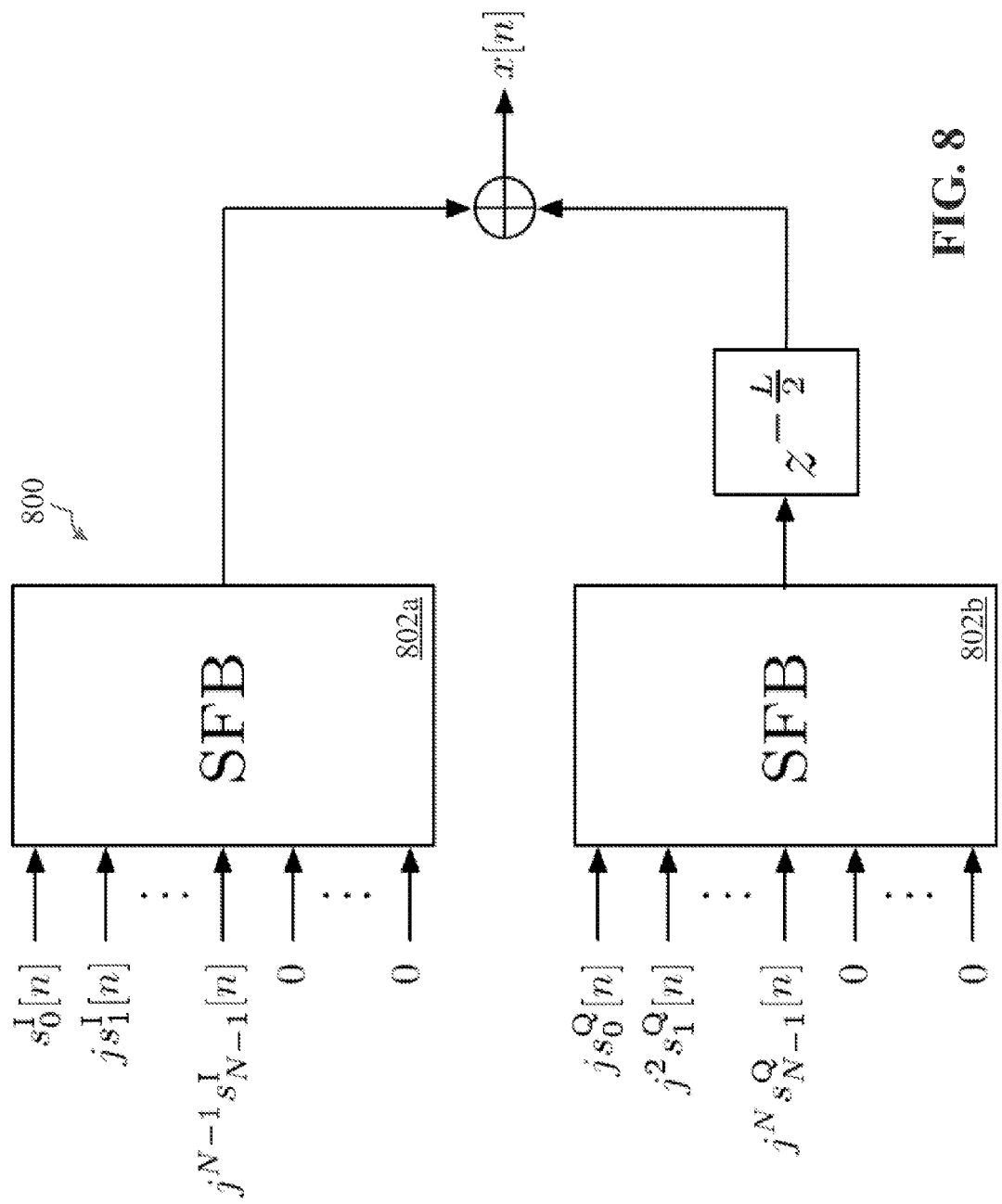
FIG. 8 depicts an example embodiment of an IDFT-based polyphase structure of a SFB of an OS N-channel OFDM-OQAM (e.g. where the SFB may be shown in FIG. 9 below).
Figure 9:
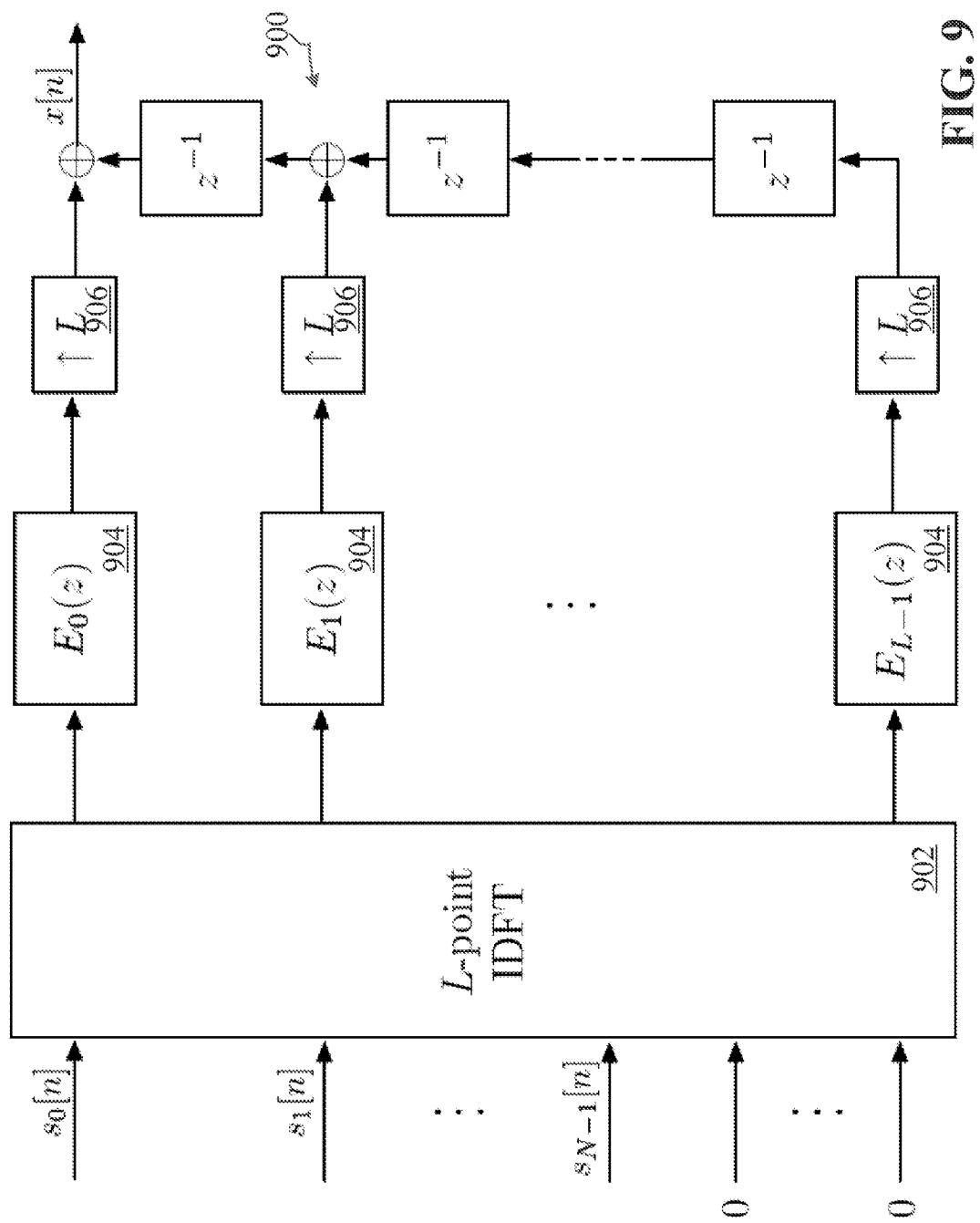
FIG. 9 depicts an example embodiment of an IDFT-based polyphase structure of a general N-channel SFB.
Figure 10:
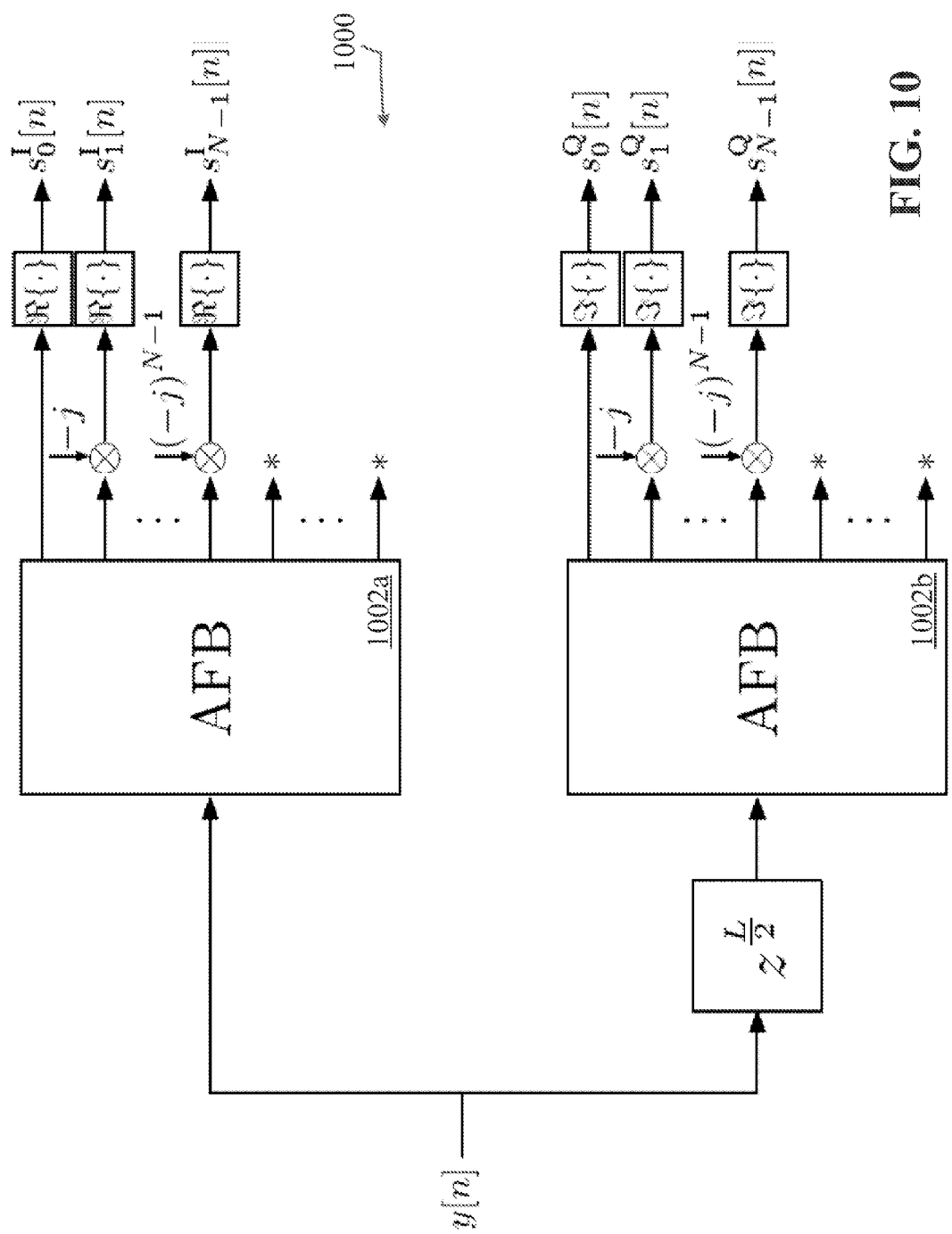
FIG. 10 depicts an example embodiment of an IDFT-based polyphase structure of an AFB of an OS N-channel OFDM-OQAM (e.g. where the AFB may be shown in FIG. 11 below).

An SFB such as SFB 800 and/or an AFB such as AFB 1000 of the OS OFDM-OQAM may be shown in FIG. 8 and FIG. 10 respectively. The OFDM-OQAMs SFB or respectively AFB may be decoupled into two SFBs such as SFBs 802a, 802b or respectively two AFBs such as AFBs 1002a, 1002b for in-phase and/or quadrature components respectively. The SFB and AFB components (e.g. included in 802a, 802b and/or 1002a, 1002b) may further be depicted in FIG. 9 and FIG. 11 respectively. In both the SFB and AFB components, polyphase filters such as polyphase filters 904 and/or 1104 may be $$E_q(z)=A_q(z), q=0,1,\ldots,L-1. \quad (51)$$

Figure 11:
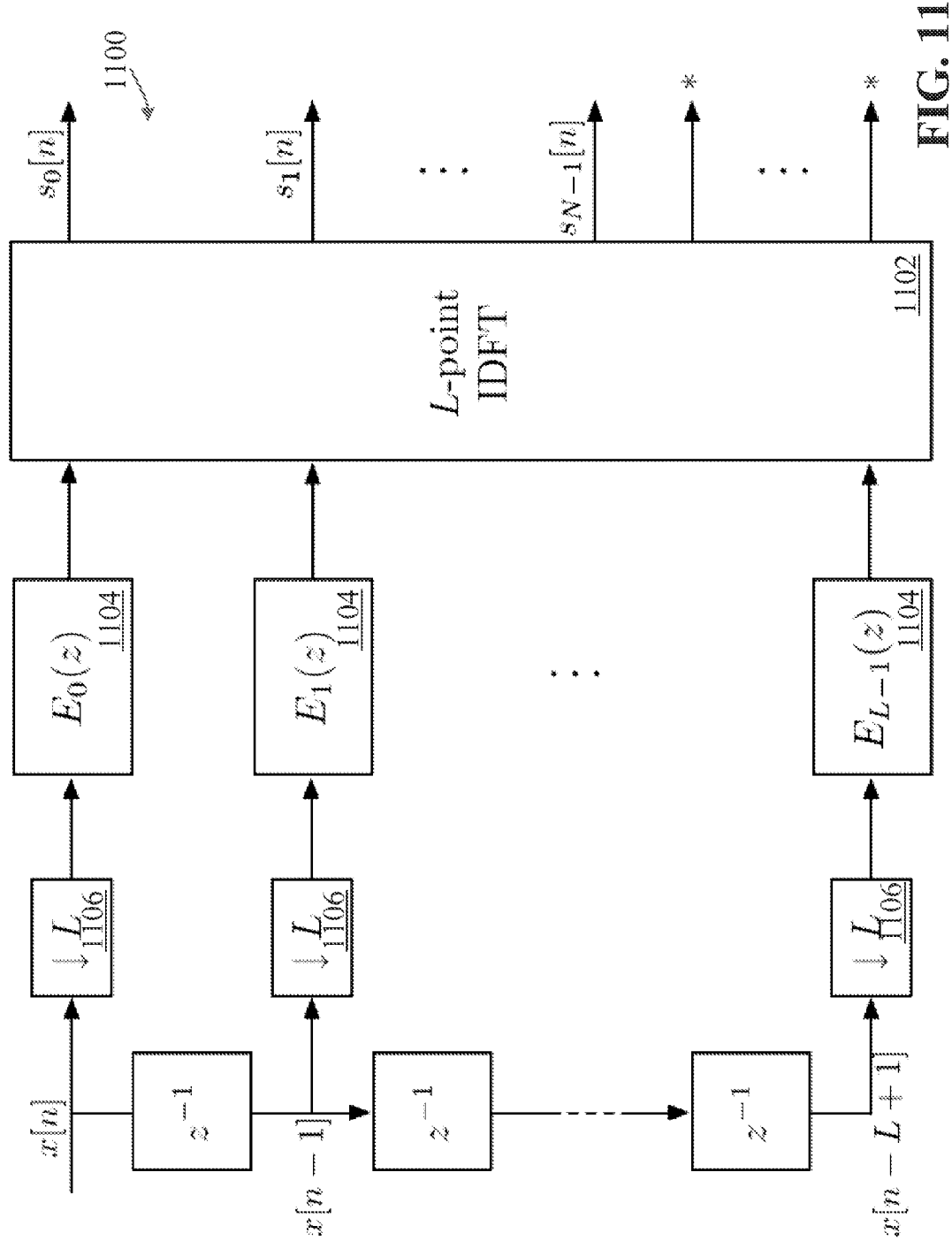
FIG. 11 depicts an example embodiment of an IDFT-based polyphase structure of a general N-channel AFB.

As shown, in an embodiment, the upsampling and/or downsampling factor such as upsampling factor 906 and/or downsampling factor 1106 in FIG. 9 and FIG. 11 may be L instead of L/2 (e.g. compared to M/2 in FIG. 6 and FIG. 7) due to the different rates of inputs to the IDFT or outputs from the DFT/IDFT. In an embodiment, the complexity of the OS OFDM-OQAM may be similar to equation (48).

The computational complexity for OFDM-OQAM may be greater than OFDM (e.g. but as described above similar to equation (48)). As such, structures (e.g. efficient structures) as described herein may be used to reduce the complexity. Systems and/or methods as described herein (e.g. below) may further reduce the complexity for OFDM-OQAM while still being able to be reused for OFDM (e.g. as a special case). In an embodiment, to be reused for OFDM, a synthesis filter bank (SFB) may be IDFT-based and an analysis filter bank (AFB) may be DFT-based.

For example, a SFB for a general prototype filter length $L_p$ may be designed or developed as described herein. In an embodiment, a SFB (e.g. for a special case) when $L_p$ may be odd may be designed or developed such that its complexity may be lower. When $L_p=KL+1$, the same complexity may be achieved using the SFB described above. In an embodiment, SFB described herein (e.g. proposed herein below) may enable or allow for a flexible choice of $L_p$ and, as such, further reduce (e.g. a slight reduction in) complexity. In an embodiment, complexity may also depend on $L_p$.

An IDFT-based AFB for a general prototype filter length $L_p$ may also be designed or developed as described herein. For example, a DFT-based AFB for a general $L_p$ may be designed or developed using permutation. The DFT-based AFB may be mathematically equivalent to the DFT-based AFB. In an embodiment, an AFB (e.g. for a special case) when $L_p$ may be odd such that its complexity may be lower. Additionally, the AFB described herein may enable or allows for a flexible choice of $L_p$ and, as such, further reduce (e.g. a slight reduction in) complexity. As described above, in an embodiment, the complexity may also depend on $L_p$.

Figure 12:
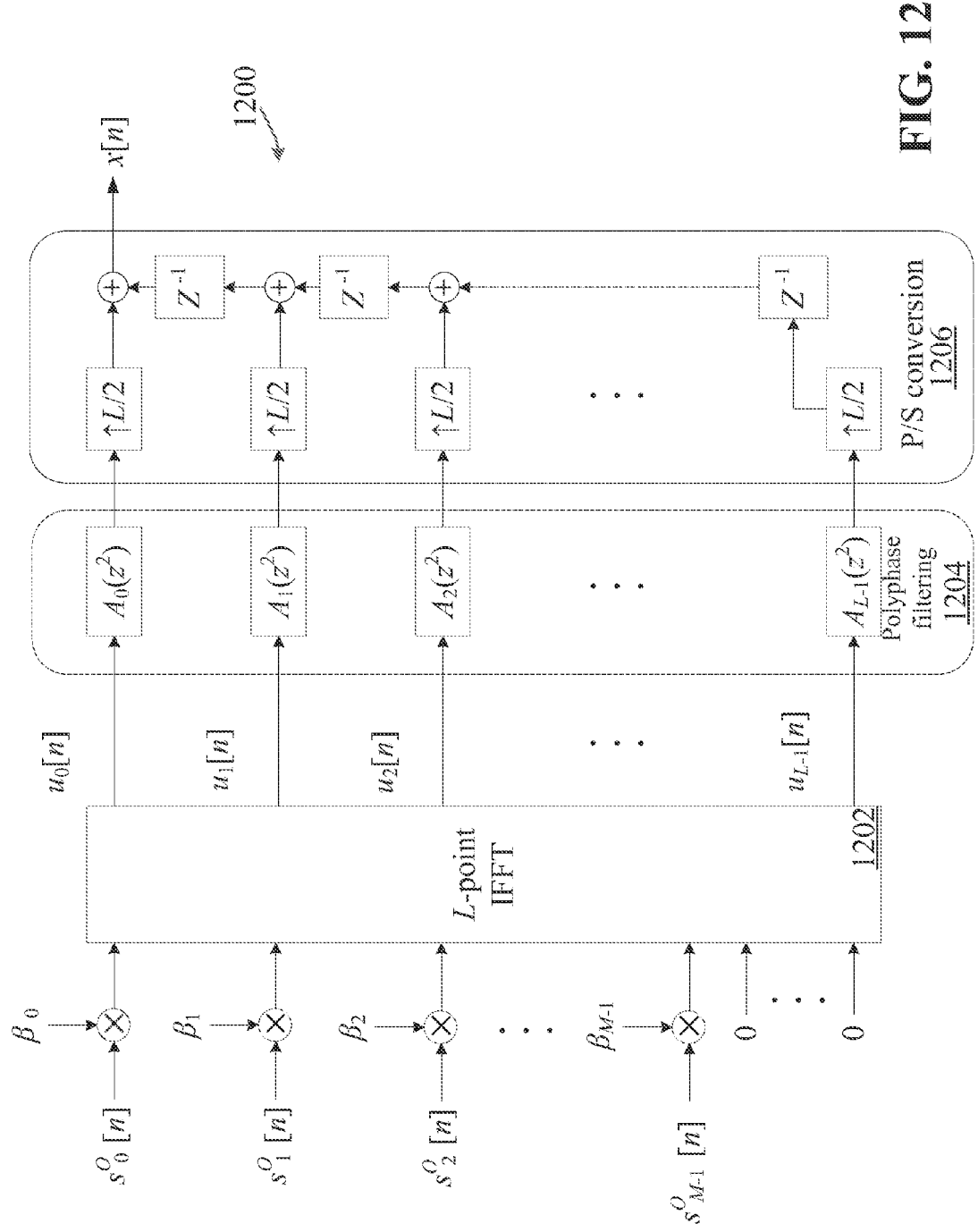
FIG. 12 depicts an example embodiment of a structure of OFDM-OQAM SFB for a length (e.g. Lp).

Systems and methods for OFDM-OQAM may include a synthesis filter bank (SFB). FIG. 12 depicts an example embodiment of a structure of an OFDM-OQAM SFB 1200 for a length (e.g. $L_p$) where the length may be any suitable value. As shown, the SFB 1200 may include an L-point IFFT component 1202, a polyphase filtering component 1204, and/or a P/S conversion component 1206. The SFB 1200 may receive one or more inputs (e.g. $S^O$) that may be multiplied (e.g. by β) and the multiplication thereof may be provided as input to the L-point IFFT component 1202 where an L-point IFFT may be performed. The output (e.g. u[n]) of the L-point IFFT component 1202 may be received by the polyphase filtering component 1204 and, after performing polyphase filtering as described herein, by the P/S conversion component 1206 where P/S conversion including upsampling may be performed. An output (e.g. x[n]) of the SFB 1200 may be generated and/or sent after P/S conversion via the P/S conversion component 1206.

In an embodiment, a Z-transform of the synthesis filter (e.g. that may be used in the polyphase filtering component 1204 of the SFB 1200) for the $k^{th}$ subcarrier may be (e.g. may be defined as)

$$G_k(z) = \beta_k \sum_{n=0}^{L_p-1} p[n] W_L^{-kn} z^{-n}. \quad (52)$$

The length of the prototype filter p[n] may be expanded from $L_p$ to $\lceil L_p/L \rceil L$ such that $$p_e[n] = \begin{cases} p[n], & n=0,\ldots,L_p-1 \\ 0, & n=L_p,\ldots,\lceil \frac{L_p}{L} \rceil L-1 \end{cases}. \quad (53)$$

In an embodiment, if n=q+mL, m=0, . . . , $\lceil L_p/L \rceil$, q=0, . . . , L−1, $G_k(z)$ in equation (52) may become $$G_k(z) = \beta_k \sum_{q=0}^{L-1} \sum_{m=0}^{\lceil L_p/L \rceil-1} p_e[q+mL] W_L^{-k(q+mL)} z^{-(q+mL)} \quad (54)$$

$$= \beta_k \sum_{q=0}^{L-1} W_L^{-kq} z^{-q} \sum_{m=0}^{\lceil L_p/L \rceil-1} p_e[q+mL] z^{-mL}.$$

The $q^{th}$ polyphase component of the prototype filter p[n] may be $$a_q[m]=p_e[q+mL], m=0,\ldots,\lceil L_p/L \rceil-1, q=0,\ldots,L-1 \quad (55)$$

and its Z-transform (e.g. shown in FIG. 12) may be $$A_q(z) = \sum_{m=0}^{\lceil L_p/L \rceil-1} a_q[m] z^{-m} = \sum_{m=0}^{\lceil L_p/L \rceil-1} p_e[q+mL] z^{-m}. \quad (56)$$

Then, $G_k(z)$ in equation (54) may become $$G_k(z) = \beta_k \sum_{q=0}^{L-1} W_L^{-kq} A_q(z^L) z^{-q}. \qquad (57)$$

In an embodiment, $G_k(z)$ in equation (57) may be expressed as a matrix multiplication as follows $$G_k(z) = \beta_k \begin{bmatrix} 1 & W_L^{-k} & \ldots & W_L^{-k(L-1)} \end{bmatrix} \begin{bmatrix} A_0(z^L) \\ A_1(z^L) z^{-1} \\ \vdots \\ A_{L-1}(z^L) z^{-(L-1)} \end{bmatrix} \qquad (58)$$

$$= \beta_k \begin{bmatrix} 1 & W_L^{-k} & \ldots & W_L^{-k(L-1)} \end{bmatrix} \begin{bmatrix} A_0(z^L) & & & \\ & A_1(z^L) & & \\ & & \ddots & \\ & & & A_{L-1}(z^L) \end{bmatrix} \begin{bmatrix} 1 \\ z^{-1} \\ \vdots \\ z^{-(L-1)} \end{bmatrix}$$

$$= \beta_k \begin{bmatrix} 1 & W_L^{-k} & \ldots & W_L^{-k(L-1)} \end{bmatrix} A(z^L) c(z)$$

where the L×L diagonal matrix may include, may be, and/or may use $$A(z^L) = \begin{bmatrix} A_0(z^L) & & & \\ & A_1(z^L) & & \\ & & \ddots & \\ & & & A_{L-1}(z^L) \end{bmatrix} \qquad (59)$$

and a L×1 delay line vector may include, may be, and/or may use $$c(z) = [1\, z^{-1}\, \ldots\, z^{-(L-1)}]^T \qquad (60)$$

such that they may be independent from k.

In an embodiment, an output of the SFB (e.g. SFB 1200) may be given as $$x[n] = \sum_{k=0}^{M-1} s^O_{k,\frac{L}{2}}[n] * g_k[n] \qquad (61)$$

and its Z-transform may be $$X(z) = \sum_{k=0}^{M-1} S^O_{k,\frac{L}{2}}(z) G_k(z) \qquad (62)$$

where $$S^O_{k,\frac{L}{2}}(z) = \sum_n s^O_{k,\frac{L}{2}}[n] z^{-n} = \qquad (63)$$

$$\sum_n \sum_l s^O_k[l] \delta\left[n - l\frac{L}{2}\right] z^{-n} = \sum_l s^O_k[l] z^{-l\frac{L}{2}} = S^O_k\left(z^{\frac{L}{2}}\right).$$

The M×1 OQAM modulated input vector (e.g. as shown in FIG. 12) may be defined as $$S^O_{\frac{L}{2}}(z) = \begin{bmatrix} S^O_{0,\frac{L}{2}}(z) & S^O_{1,\frac{L}{2}}(z) & \ldots & S^O_{M-1,\frac{L}{2}}(z) \end{bmatrix}^T \qquad (64)$$

$$= \begin{bmatrix} S^O_0\left(z^{\frac{L}{2}}\right) & S^O_1\left(z^{\frac{L}{2}}\right) & \ldots & S^O_{M-1}\left(z^{\frac{L}{2}}\right) \end{bmatrix}^T$$

$$= S^O\left(z^{\frac{L}{2}}\right)$$

and the M×1 vector may include, may be, and/or may use $$G(z) = [G_0(z) G_1(z) \ldots G_{M-1}(z)]^T. \qquad (65)$$

In an embodiment, equation (58) may be substituted into equation (65) such that $$G(z) = \begin{bmatrix} G_0(z) \\ G_1(z) \\ \vdots \\ G_{M-1}(z) \end{bmatrix} \qquad (66)$$

where $$= \begin{bmatrix} \beta_0 & & & \\ & \beta_1 & & \\ & & \ddots & \\ & & & \beta_{M-1} \end{bmatrix} \begin{bmatrix} 1 & 1 & \ldots & 1 \\ 1 & W_L^{-1} & \ldots & W_L^{-(L-1)} \\ \vdots & \vdots & \ddots & \vdots \\ 1 & W_L^{-(M-1)} & \ldots & W_L^{-(M-1)(L-1)} \end{bmatrix} A(z^L) c(z)$$

$$= \begin{bmatrix} \beta_0 & & & \\ & \beta_1 & & \\ & & \ddots & \\ & & & \beta_{M-1} \end{bmatrix} [I_M \quad 0_{M \times L}] \begin{bmatrix} 1 & 1 & \ldots & 1 \\ 1 & W_L^{-1} & \ldots & W_L^{-(L-1)} \\ \vdots & \vdots & \ddots & \vdots \\ 1 & W_L^{-(L-1)} & \ldots & W_L^{-(L-1)(L-1)} \end{bmatrix} A(z^L) c(z)$$

$$= B[I_M \quad 0_{M \times (L-M)}] F_L^H A(z^L) c(z)$$

$$B = \begin{bmatrix} \beta_0 & & & \\ & \beta_1 & & \\ & & \ddots & \\ & & & \beta_{M-1} \end{bmatrix} \qquad (67)$$

which may be a constant diagonal matrix, and the constant L-point DFT matrix (e.g. that may be applied by the L-point IFFT component 1202) may include, may be, and/or may use $$F_L = \begin{bmatrix} 1 & 1 & \ldots & 1 \\ 1 & W_L & \ldots & W_L^{L-1} \\ \vdots & \vdots & \ddots & \vdots \\ 1 & W_L^{L-1} & \ldots & W_L^{(L-1)(L-1)} \end{bmatrix} = [w_0 \quad w_1 \quad \ldots \quad w_{L-1}] \qquad (68)$$

where $$w_q = [1 \quad W_L^q \quad \ldots \quad W_L^{q(L-1)}]^T. \qquad (69)$$

As such, in an embodiment, X(z) in equation (62) may be expressed as matrix multiplication as follows $$X(z) = G^T(z) S^O\left(z^{\frac{L}{2}}\right) \qquad (70)$$

$$= \left(B \begin{bmatrix} I_M & 0_{M\times(L-M)} \end{bmatrix} F_L^H A(z^L) c(z)\right)^T S^O\left(z^{\frac{L}{2}}\right)$$

$$= c^T(z) A(z^L) F_L^H \begin{bmatrix} I_M \\ 0_{(L-M)\times M} \end{bmatrix} B S^O\left(z^{\frac{L}{2}}\right).$$

In an embodiment, the above equation may be interpreted such that that the OQAM modulated symbol sequences $s_k^O[n]$, k=0, ..., M−1 (e.g. as shown in FIG. 12) may go through upsampling by $$\frac{L}{2}$$

(e.g. via the P/S conversion component 1206), $\beta_k$-multipliers, L−M zero-padding, IDFT, polyphase filters $A_q(z^L)$, q=0, ..., L−1, and delay chain (e.g. a parallel-to-serial (P/S) conversion). According to an example, $$F_L^H \begin{bmatrix} I_M \\ 0_{(L-M)\times M} \end{bmatrix} B$$

may be a constant matrix.

An arbitrary matrix may be defined as $$x = \begin{bmatrix} \cdots & x_0[n] & x_0[n+1] & \cdots \\ \cdots & x_1[n] & x_1[n+1] & \cdots \\ & & \vdots & \\ \cdots & x_{M-1}[n] & x_{M-1}[n+1] & \cdots \end{bmatrix} = [\cdots \; x[n] \; x[n+1] \; \cdots] \qquad (71)$$

where $$x[n] = [x_0[n] \; x_1[n] \; \ldots \; x_{M-1}[n]]^T. \qquad (72)$$

The following property for general M and L $$CX(z^L) = C \begin{bmatrix} X_0(z^L) \\ X_1(z^L) \\ \vdots \\ X_{M-1}(z^L) \end{bmatrix} \qquad (73)$$

$$= C \begin{bmatrix} \sum_n x_0[n] z^{-nL} \\ \sum_n x_1[n] z^{-nL} \\ \vdots \\ \sum_n x_{M-1}[n] z^{-nL} \end{bmatrix}$$

$$= C \begin{bmatrix} \cdots & x_0[n] & x_0[n+1] & \cdots \\ \cdots & x_1[n] & x_1[n+1] & \cdots \\ & & \vdots & \\ \cdots & x_{M-1}[n] & x_{M-1}[n+1] & \cdots \end{bmatrix} \begin{bmatrix} \vdots \\ z^{-nL} \\ z^{-(n+1)L} \\ \vdots \end{bmatrix}$$

$$= C [\cdots \; x[n] \; x[n+1] \; \cdots] \begin{bmatrix} \vdots \\ z^{-nL} \\ z^{-(n+1)L} \\ \vdots \end{bmatrix}$$

$$= [\cdots \; Cx[n] \; Cx[n+1] \; \cdots] \begin{bmatrix} \vdots \\ z^{-nL} \\ z^{-(n+1)L} \\ \vdots \end{bmatrix} = [CX](z^L)$$

(e.g. where C may be a constant matrix) may show that the order between multiplication by a constant matrix and upsampling may be exchanged. Therefore, X(z) in (70) may be written as $$X(z) = c^T(z) A(z^L) \left\{ F_L^H \begin{bmatrix} I_M \\ 0_{(L-M)\times M} \end{bmatrix} B S^O \right\}\left(z^{\frac{L}{2}}\right). \qquad (74)$$

Additionally, $$\left(A(z^L) = A\left((z^2)^{\frac{L}{2}}\right)\right).$$

The following properties $$R(z)=X(z)Y(z) \Leftrightarrow r[n]=x[n]*y[n] \qquad (75)$$

$$R(z^L)=X(z^L)Y(z^L) \Leftrightarrow [\uparrow L]r[n]=([\uparrow L]x[n])*([\uparrow L]y[n]) \qquad (76)$$

for general L may show that X(z) in (74) may be written as $$X(z) = c^T(z) \left\{ A_2 F_L^H \begin{bmatrix} I_M \\ 0_{(L-M)\times M} \end{bmatrix} B S^O \right\}\left(z^{\frac{L}{2}}\right) \qquad (77)$$

where $$A_2(z) = A(z^2). \qquad (78)$$

Additionally, in an embodiment, X(z) in equation (77) may be interpreted such that that the OQAM modulated symbol sequences $s_k^O[n]$, k=0, ..., M−1 (e.g. as shown in FIG. 12) may go through $\beta_k$-multipliers, L−M zero-padding, IDFT, polyphase filters $A_q(z^2)$, q=0, ..., L−1, upsampling by $$\frac{L}{2}$$

and delay chain (e.g. P/S conversion). As described herein, such an embodiment may result in a polyphase structure as shown in FIG. 12.

In discrete time domain, the M-stream OQAM modulated sequences may be defined as $$s^O = \begin{bmatrix} \cdots & s_0^O[n] & s_0^O[n+1] & \cdots \\ \cdots & s_1^O[n] & s_1^O[n+1] & \cdots \\ & & \vdots & \\ \cdots & s_{M-1}^O[n] & s_{M-1}^O[n+1] & \cdots \end{bmatrix} = \quad (79)$$

$$[\ \cdots\ s^O[n]\ s^O[n+1]\ \cdots\ ]$$

where $$s^O[n] = [\ s_0^O[n]\ s_1^O[n]\ \cdots\ s_{M-1}^O[n]\ ]^T. \quad (80)$$

From equation (77), the output of a SFB (e.g. SFB 1200 shown in FIG. 12) that may be used herein may be $$x[n] = \sum_{q=0}^{L-1} v_q[n] * \delta[n-q] = \sum_{q=0}^{L-1} v_q[n-q] \quad (81)$$

where $$v_q[n] = \left[\uparrow \frac{L}{2}\right](u_q[n] * ([\uparrow 2]a_q[n])), \quad (82)$$

and $$u[n] = F_L^H \begin{bmatrix} I_M \\ 0_{(L-M)\times M} \end{bmatrix} B s^O[n], \quad (83)$$

and $$u[n] = [\ u_0[n]\ u_1[n]\ \cdots\ u_{L-1}[n]\ ]^T. \quad (84)$$

As described above, $L_p$ (e.g. in a special case) may be odd. According to an example embodiment, a structure for the SFB (e.g. in the special case) when $L_p$ may be odd as described herein below. In such an embodiment (e.g. when the filter length may be odd), the complexity of a SFB may be reduced, for example, compared to the SFB 1200 described above and shown in FIG. 12. For example, when $L_p$ may be odd such as L=KL±1, KL±3, and the like, the complexity of a SFB may be reduced.

Figure 13:
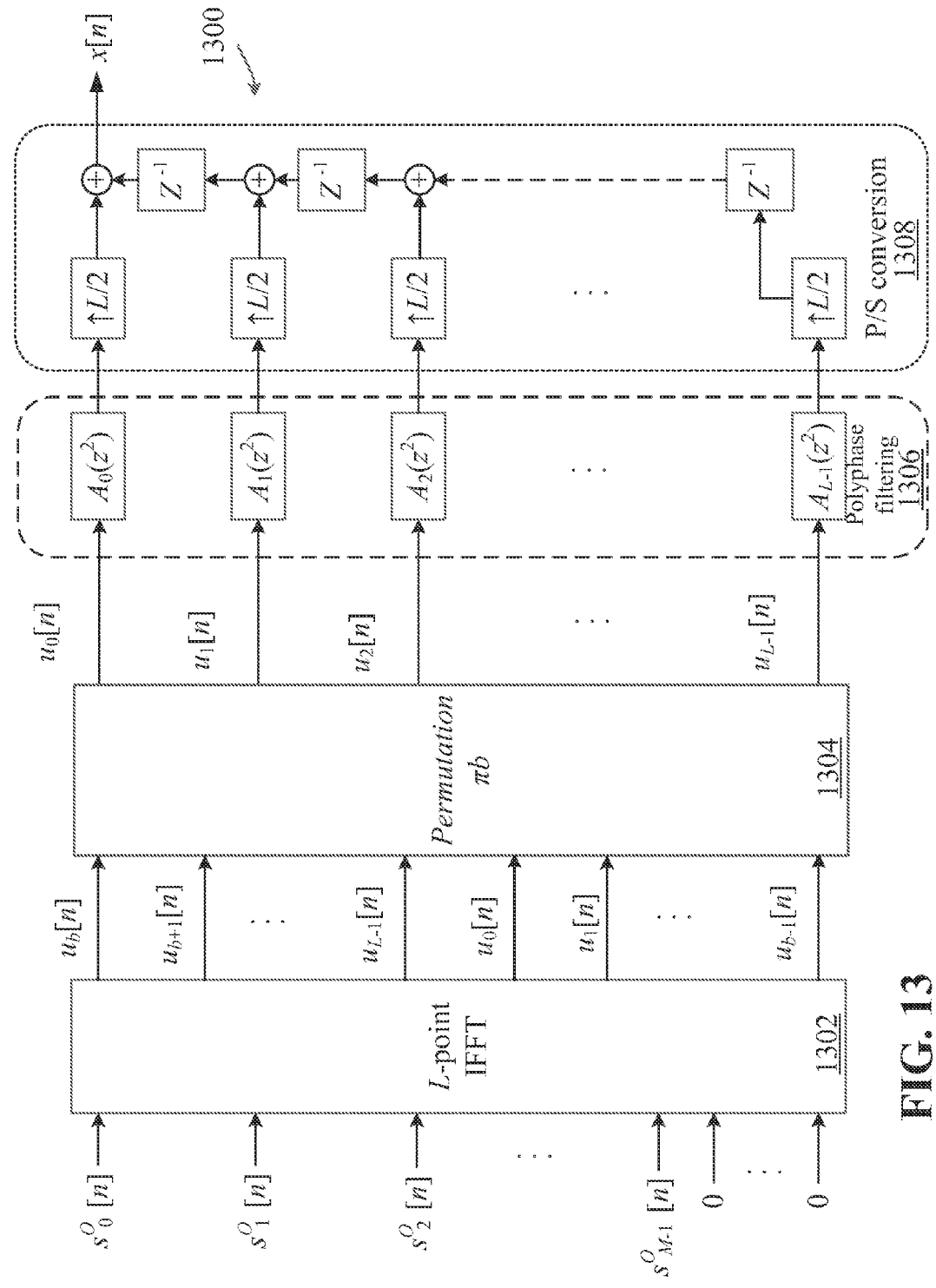
FIG. 13 depicts an example embodiment of a structure of OFDM-OQAM SFB for a length (e.g. Lp) where the length may be odd.

FIG. 13 depicts an example embodiment of a structure of an OFDM-OQAM SFB 1300 for a length (e.g. $L_p$) where the length may be odd. As shown, the SFB 1300 may include an L-point IFFT component 1302, a permutation component 1304, polyphase filtering component 1306, and/or a P/S conversion component 1308. The SFB 1300 may receive one or more inputs (e.g. $S^O$) that may be provided as input to the L-point IFFT component 1302 where IDFT and/or IFFT may be performed. The output (e.g. $u_0[n]$ to $u_{b-1}[n]$ as shown) of the L-point IFFT component 1302 may be received by the permutation component 1304. The permutation component 1304 may reduce the complexity by applying permutation πb to the input as described herein (e.g. below). The output (e.g. $u_0[n]$ to $u_{L-1}[n]$ as shown) of the permutation component 1304 may be received by the polyphase filtering component 1306 and, after performing polyphase filtering as described herein, by the P/S conversion component 1308 where P/S conversion including, for example, upsampling may be performed. An output (e.g. x[n]) of the SFB 1300 may be generated and/or sent after P/S conversion via the P/S conversion component 1308.

In such an embodiment (e.g. as shown in FIG. 13) where he length may be odd and the complexity may be reduced, $$b = \frac{(L_p - 1)}{2}$$

may be an integer. Additionally, the $\beta_k$ multiplier matrix may be represented as $$B = \begin{bmatrix} 1 & & & \\ & W_L^b & & \\ & & \ddots & \\ & & & W_L^{(M-1)b} \end{bmatrix}. \quad (85)$$

Then, the following may be obtained $$\begin{bmatrix} I_M \\ 0_{(L-M)\times M} \end{bmatrix} B = \Lambda_{\pi b} \begin{bmatrix} I_M \\ 0_{(L-M)\times M} \end{bmatrix} \quad (86)$$

where the L×L constant matrix may include, may be, and/or may use $$\Lambda_{\pi b} = \begin{bmatrix} 1 & & & \\ & W_L^b & & \\ & & \ddots & \\ & & & W_L^{(L-1)b} \end{bmatrix}. \quad (87)$$

In an embodiment, $\Lambda_{\pi b}$ may be rewritten as equation (149) below. Additionally, substituting equations (86) and (149) into equation (77) the following may be obtained or generated $$\begin{aligned} X(z) &= c^T(z)\left\{A_2 F_L^H \Lambda_{\pi b} \begin{bmatrix} I_M \\ 0_{(L-M)\times M} \end{bmatrix} S^O \right\}\left(z^{\frac{L}{2}}\right) \\ &= c^T(z)\left\{A_2 F_L^H F_L P_{\pi b} \frac{1}{L} F_L^H \begin{bmatrix} I_M \\ 0_{(L-M)\times M} \end{bmatrix} S^O \right\}\left(z^{\frac{L}{2}}\right) \\ &= c^T(z)\left\{A_2 P_{\pi b} F_L^H \begin{bmatrix} I_M \\ 0_{(L-M)\times M} \end{bmatrix} S^O \right\}\left(z^{\frac{L}{2}}\right). \end{aligned} \quad (88)$$

According to an example embodiment, X(z) in equation (88) may be interpreted such that OQAM modulated symbol sequences $s_k^O[n]$, k=0, . . . , M−1 (e.g. the input shown in FIG. 13) may go through L−M zero-padding, IDFT (e.g. via the L-point IFFT component 1302), permutation $P_{\pi b}$ (e.g. via the permutation component 1304), polyphase filters $A_q(z^2)$, q=0, . . . , L−1 (e.g. via polyphase filtering component 1306), upsampling by $$\frac{L}{2}$$

and delay chain (e.g. P/S conversion in the P/S conversion component 1308). As described herein, such embodiments may result in a polyphase structure shown in FIG. 13.

In discrete time domain, the output of the SFB may be written as equation (81) where $v_q[n]$ may be given in equation (82), and u[n] may be given as $$u[n] = P_{\pi b} F_L^H \begin{bmatrix} I_M \\ 0_{(L-M)\times M} \end{bmatrix} s^O[n]. \quad (89)$$

The complexity associated with the SFB above may be reduced as described herein. For example, the number of real multiplications of an L-point IFFT with M complex (e.g. respectively real and imaginary such as purely real and imaginary) may be denoted as inputs to or as $\mu_{IFFT}^C(M, L)$ and also respectfully $\mu_{IFFT}^{R/I}(M, L)$. Due to zero padding.

$$\mu_{IFFT}^C(M, L) \le L\log_2 L - 3L + 4$$

and $$\mu_{IFFT}^{R/I}(M, L) \le \frac{L}{2}\log_2\frac{L}{2} - 3\frac{L}{2} + 4 = \frac{L}{2}\log_2 L - 2L + 4$$

such that equality may be met if L=M.

In comparison, the number of real multiplications for each of the M QAM symbols in the OFDM SFB may be derived as $$\mu_{OFDM,SFB}(M,L) = \mu_{IFFT}^C(M,L) \le L\log_2 L - 3L + 4. \quad (90)$$

For a general $L_p$ (e.g. where the length $L_p$ may be any value), the SFB structure may be based on equation (77) and/or may be shown in FIG. 12 as described herein. Additionally, for each of the M OQAM symbols, the $\mu_k$-multiplication may have 2M real multiplications; the L-point IFFT with complex inputs may have $\mu_{IFFT}^C(M,L)$ real multiplications; and/or the polyphase filtering of L branches may have $2L_p$ real multiplications. As such, the total number of real multiplications for each of the M QAM symbols or equivalently 2M OQAM symbols may be $$\mu_{OFDM-OQAM,SFB}(M, L, L_p) = 2(2M + \mu_{IFFT}^C(M, L) + 2L_p) \quad (91)$$
$$= 4M + 2\mu_{IFFT}^C(M, L) + 4L_p \le$$
$$4M + 2(L\log_2 L - 3L + 4) + 4L_p$$
$$= 2L\log_2 L - 6L + 4L_p + 4M + 8.$$

When $L_p$ may be odd (e.g. the special case), the SFB structure may be based on equation (88) and may be shown in FIG. 13. In such an embodiment, the complexity of the SFB may be reduced. For example, in an embodiment, the number of real multiplications in the permutation $P_{\pi b}$ may also be 0. Additionally, the inputs to the L-point IFFT may be real and imaginary (e.g. purely real and imaginary). As such, the total number of real multiplications for each of the M QAM symbols or equivalently 2M OQAM symbols may be $$\mu_{OFDM-OQAM,SFB,Lpodd}(M, L, L_p) = \quad (92)$$
$$2(\mu_{IFFT}^{R/I}(M, L) + 2L_p) = 2\mu_{IFFT}^{R/I}(M, L) + 4L_p \le$$
$$2\left(\frac{L}{2}\log_2 L - 2L + 4\right) + 4L_p = L\log_2 L - 4L + 4L_p + 8.$$

According to another example embodiment, systems and methods for OFDM-OQAM may include an analysis filter bank (AFB). In such an embodiment (e.g. since the analysis filters may be the same as the synthesis filters), the Z-transform of the analysis filter for the kth subcarrier may be $$F_k(Z) = G_k(z). \quad (93)$$

The M×1 estimated OQAM modulated output vector may then be defined $$\hat{s}^O(z^{\frac{L}{2}}) = \left[\hat{S}_0^O(z^{\frac{L}{2}}) \ \hat{S}_1^O(z^{\frac{L}{2}}) \ \ldots \ \hat{S}_{M-1}^O(z^{\frac{L}{2}})\right]^T \quad (94)$$

where $$\hat{S}_k^O(z^{\frac{L}{2}}) = \sum_l \hat{s}_k^O[l] z^{-l\frac{L}{2}} \quad (95)$$

and the M×1 vector may include, may be, and/or may use $$F(z) = [F_0(z) F_1(z) \ldots F_{M-1}(z)]^T = G(z). \quad (96)$$

Figure 14:
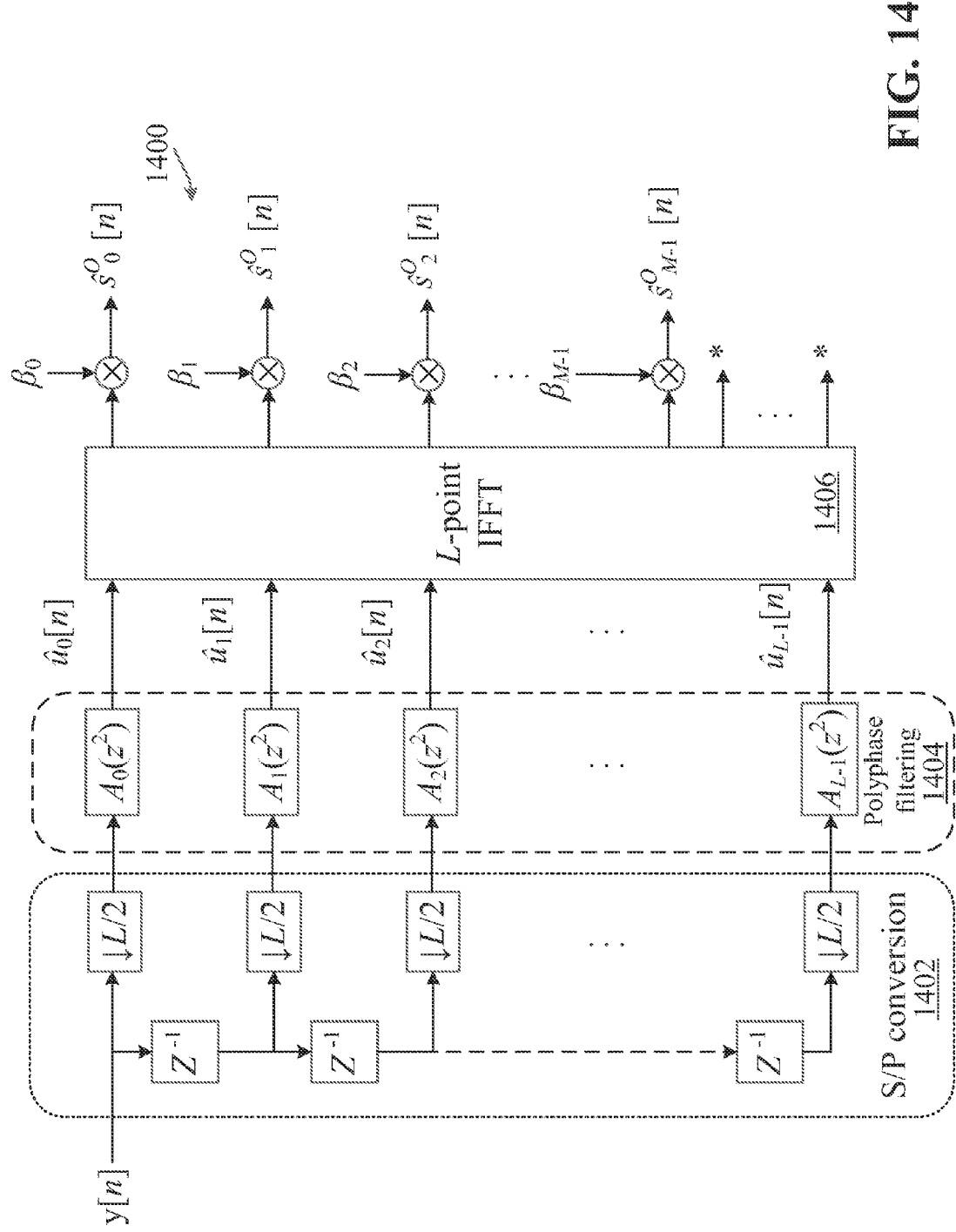
FIG. 14 depicts an example embodiment of a structure of IDFT-based OFDM-OQAM AFB for a length (e.g. Lp).

Systems and methods for OFDM-OQAM may also include IDFT-based AFB. FIG. 14 depicts an example embodiment of a structure of IDFT-based OFDM-OQAM AFB 1400 for a length (e.g. $L_p$) where the length may be any suitable value. As shown, the IDFT-based AFB 1400 may include a S/P conversion component 1402, a polyphase filtering component 1404, and an L-point IFFT component 1406. The AFB 1400 may receive an input (e.g. y[n]) that may be downsampled and/or may have a delay chain applied with the S/P conversion component 1402. The outputs of the S/P conversion component 1402 may be received by the polyphase filtering component 1404. After performing polyphase filtering, IDFT may be performed on outputs (e.g. û) of the polyphase filtering component 1404 by the L-point IFFT component 1406. The outputs of the L-point IFFT component 1406 may then be multiplied (e.g. by β) and the multiplication thereof may be provided as outputs (e.g. ŝ) of the IDFT-based AFB 1400 as described herein.

For example, in such an embodiment, the output of an IDFT-based AFB (e.g. 1400) may be expressed as $$\hat{s}^O(z^{\frac{L}{2}}) = F(z)Y(z) = B[\ I_M \ \ 0_{M\times(L-M)}\ ]F_L^H A(z^L)c(z)Y(z). \quad (97)$$

The output of the AFB in equation (97) may further be rewritten as $$\hat{s}^O(z^{\frac{L}{2}}) = \{B[\ I_M \ \ 0_{M\times(L-M)}\ ]F_L^H A_2\}(z^{\frac{L}{2}})c(z)Y(z). \quad (98)$$

The above equation (e.g. equation (98)) may be interpreted such that the received sample sequence y[n] or input to the AFB may go through a delay chain and/or downsampling by $$\frac{L}{2}$$

(e.g. via the S/P conversion component 1402), polyphase filters $A_q(z^2)$, q=0, ..., L−1 (e.g. via the polyphase filtering component 1404), IDFT (e.g. via the L-point IFFT component 1406), discarding irrelevant outputs from IDFT, and/or $\beta_k$-multipliers to obtain estimated OQAM modulated symbol sequences $s_k^O[n]$, k=0, ..., M−1 that may be output from the AFB (e.g. 1400). Such an embodiment may result in a polyphase structure shown in FIG. 14 where irrelevant outputs may be marked with stars.

In discrete time domain, M-stream estimated OQAM modulated sequences may be defined as $$\hat{s}^O = \begin{bmatrix} \cdots & \hat{s}_0^O[n] & \hat{s}_0^O[n+1] & \cdots \\ \cdots & \hat{s}_1^O[n] & \hat{s}_1^O[n+1] & \cdots \\ & & \vdots & \\ \cdots & \hat{s}_{M-1}^O[n] & \hat{s}_{M-1}^O[n+1] & \cdots \end{bmatrix} = \qquad (99)$$

$$[\ldots \; \hat{s}^O[n] \; \hat{s}^O[n+1] \; \ldots]$$

where $$\hat{s}^O[n] = [\hat{s}_0^O[n] \; \hat{s}_1^O[n] \; \ldots \; \hat{s}_{M-1}^O[n]]^T. \qquad (100)$$

In an embodiment (e.g. from equation (77)), the output of the AFB (e.g. 1400) may be written as $$\hat{s}^O[n] = B[I_M \; 0_{M \times (L-M)}] F_L^H \hat{u}[n] \qquad (101)$$

where $$\hat{u}[n] = [\hat{u}_0[n] \; \hat{u}_1[n] \; \ldots \; \hat{u}_{L-1}[n]]^T \qquad (102)$$

and $$\hat{u}_q[n] = \left(\left[\downarrow \frac{L}{2}\right] \hat{v}_q[n] * ([\uparrow 2] a_q[n])\right) \qquad (103)$$

and where $$\hat{v}_q[n] = y[n-q], q = 0, 1, \ldots, L-1. \qquad (104)$$

Systems and methods for OFDM-OQAM may also include DFT-based AFB. In an embodiment, a DFT-based AFB that may be provided herein may use a permutation and may be different from other DFT-based AFBs such as that described above. Additionally, the structure may have the same complexity as other DFT-based AFBs (e.g. such as the one in described above).

Figure 15:
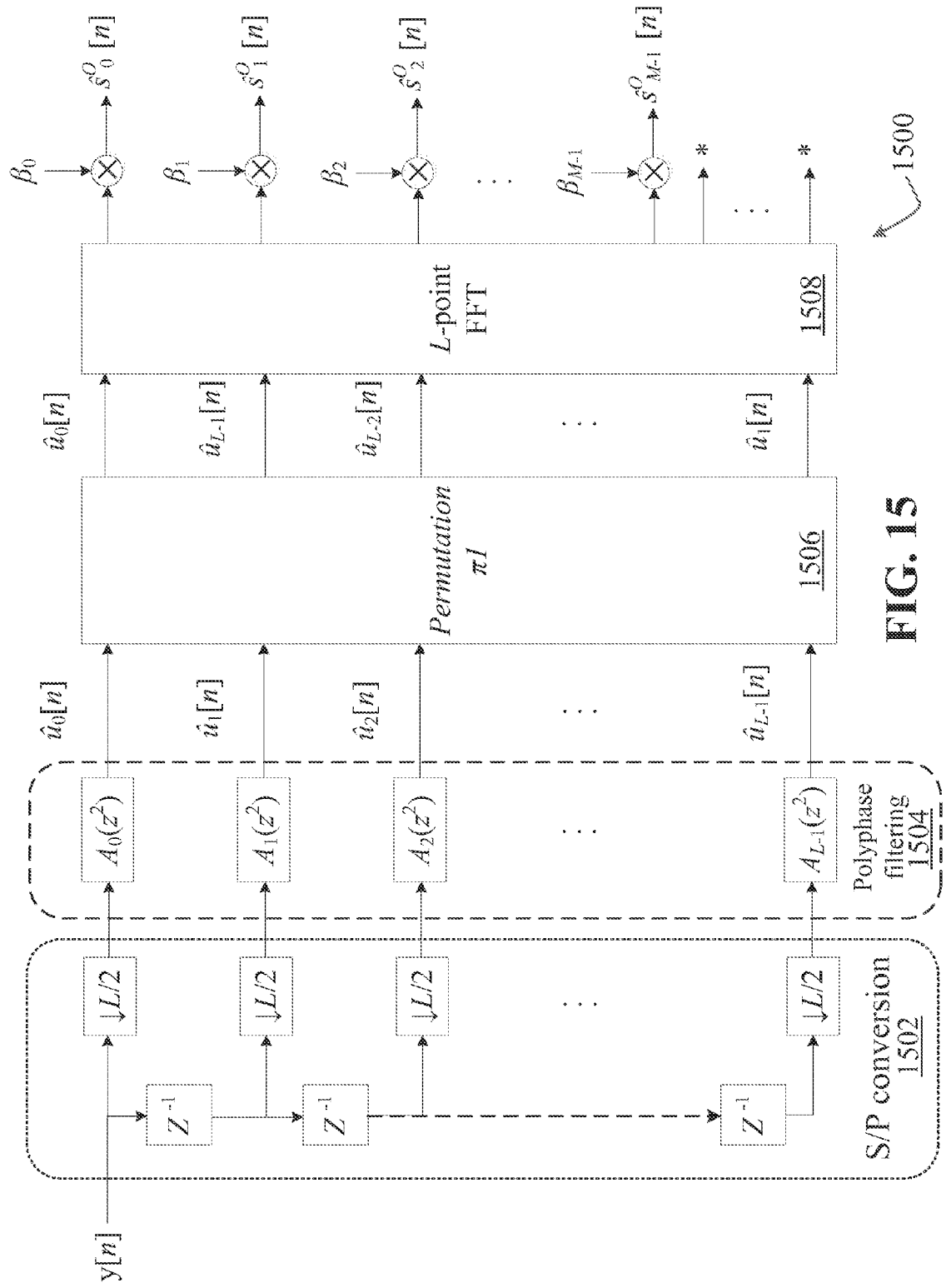
FIG. 15 depicts an example embodiment of a structure of DFT-based OFDM-OQAM AFB for a length (e.g. Lp).

FIG. 15 depicts an example embodiment of a structure of DFT-based OFDM-OQAM AFB 1500 for a length (e.g. $L_p$) where the length may be any suitable value. As shown, the DFT-based AFB 1500 may include a S/P conversion component 1502, a polyphase filtering component 1504, a permutation component 1506, and an L-point FFT component 1508. The AFB 1500 may receive an input (e.g. y[n]) that may be downsampled and/or may have a delay chain applied with the S/P conversion component 1502. The outputs of the S/P conversion component 1502 may be received by the polyphase filtering component 1504. After performing polyphase filtering, a permutation (e.g. π1) may be applied on outputs (e.g. $\hat{u}_0$ to $\hat{u}_{L-1}$) of the polyphase filtering component 1504. As shown, DFT may be performed on outputs (e.g. $\hat{u}_0$ to $\hat{u}_1$) of the permutation component 1506 by the L-point FFT component 1508. The outputs of the L-point FFT component 1508 may then be multiplied (e.g. by β) and the multiplication thereof may be provided as outputs (e.g. ŝ) of the DFT-based AFB 1500 as described herein.

In an embodiment (e.g. due to the compatibility of DFT and IDFT), the IDFT-based AFB (e.g. the AFB 1400 shown in FIG. 14) may be transformed into a DFT-based AFB (e.g. the AFB 1500 shown in FIG. 15). The IDFT matrix $F_L^H$ may be expressed as equation (133), i.e.

$$F_L^H = F_L P_{\pi 1} \qquad (105)$$

where the permutation matrix for permutation π1:{1, 2, 3, ..., L}→{1, L, L−1, ..., 2} may be $$P_{\pi 1} = \begin{bmatrix} 1 & 0 & \cdots & \cdots & 0 \\ 0 & \cdots & \cdots & 0 & 1 \\ 0 & \cdots & 0 & 1 & 0 \\ \vdots & \ddots & \ddots & \ddots & \vdots \\ 0 & 1 & 0 & \cdots & 0 \end{bmatrix}. \qquad (106)$$

Substituting equation (105) into equation (98), the output of the DFT-based AFB (e.g. 1500) may be expressed as $$\hat{S}^O(z^{\frac{L}{2}}) = \{B[I_M \; 0_{M \times (L-M)}] F_L P_{\pi 1} A_2\}(z^{\frac{L}{2}}) c(z) Y(z) \qquad (107)$$

where the same $\beta_k$-multipliers may be used. The above equation can may be interpreted such that the received sample sequence y[n] (e.g. the input shown in FIG. 15) may go through the delay chain and/or downsampling by $$\frac{L}{2}$$

(e.g. via the S/P conversion component 1502), polyphase filters $A_q(z^2)$, q=0, ..., L−1 (e.g. via the polyphase filtering component 1504), a permutation $P_{\pi 1}$ (e.g. via the permutation component 1506), DFT (e.g. via the I-point FFT component 1508), discarding irrelevant outputs from DFT, and $\beta_k$-multipliers to obtain estimated OQAM modulated symbol sequences $\hat{s}_k^O[n]$, k=0, ..., M−1 (e.g. the outputs shown in FIG. 15). Such embodiments may result in the polyphase structure in FIG. 15 where the irrelevant outputs may be marked with stars. In discrete time domain, the output of the DFT-based AFB with $\beta_k$-multipliers may be written as $$\hat{s}^O[n] = B[I_M 0_{M \times (L-M)}] F_L P_{\pi 1} \hat{u}[n] \qquad (108)$$

where û[n] may be defined in equation (102).

According to an embodiment, a structure for an AFB (e.g. in the special case) when $L_p$ may be odd may also be provided. In an example, the complexity of the AFB may be reduced (e.g. slightly) when $L_p$ may be odd (e.g. when $L_p$=KL±1, KL±3, and the like). As with the SFB, the $\beta_k$ multipliers may be absorbed into the permutation matrix $P_{\pi b}$.

Figure 16:
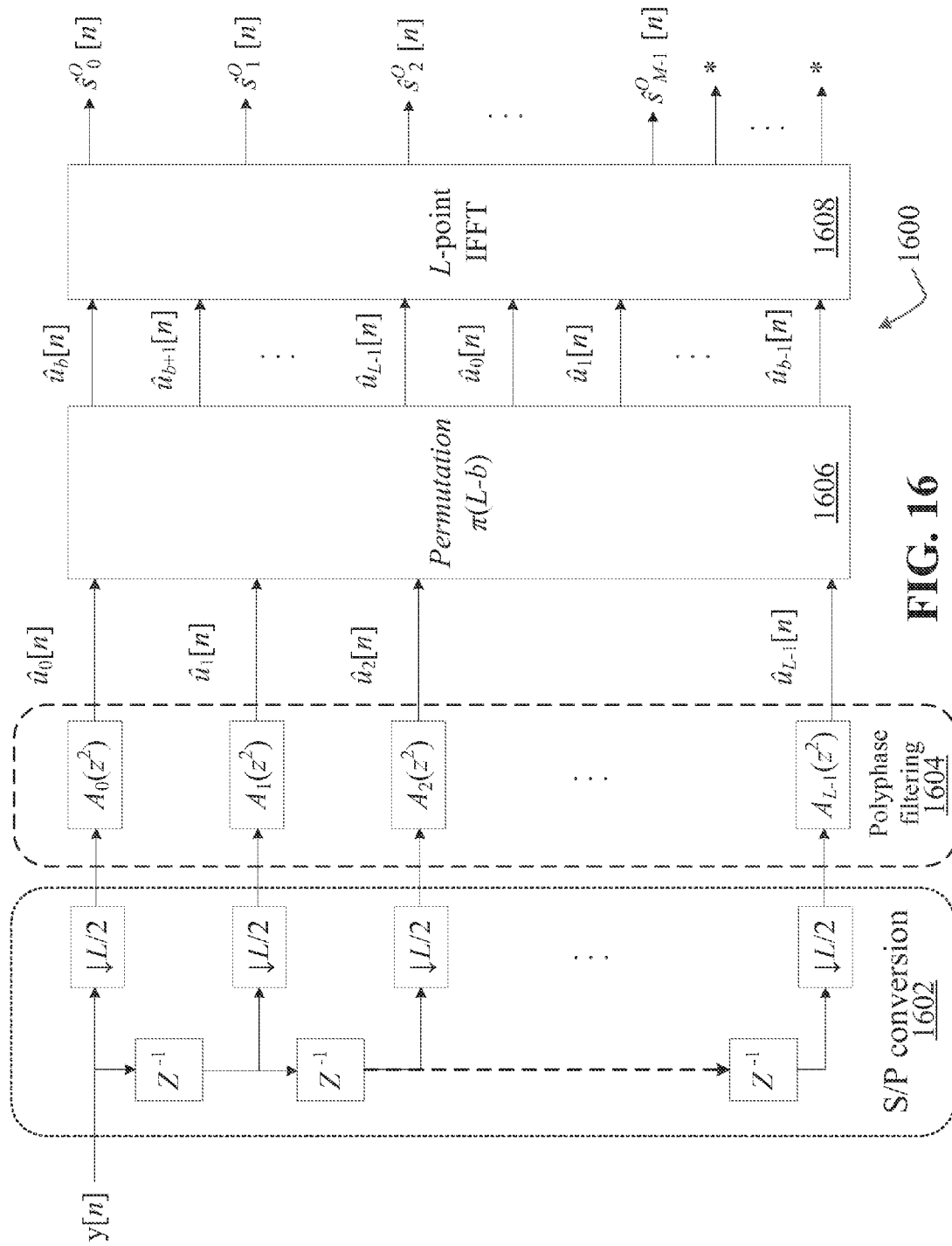
FIG. 16 depicts an example embodiment of a structure of IDFT-based OFDM-OQAM AFB for a length (e.g. Lp) where the length may be odd.

FIG. 16 depicts an example embodiment of a structure of an IDFT-based OFDM-OQAM AFB 1600 for a length (e.g. $L_p$) where the length may be odd. As shown, the IDFT-based AFB 1600 may include a S/P conversion component 1602, a polyphase filtering component 1604, a permutation component 1606, and an L-point IFFT component 1608. The AFB 1600 may receive an input (e.g. y[n]) that may be downsampled and/or may have a delay chain applied with the S/P conversion component 1602. The outputs of the S/P conversion component 1602 may be received by the polyphase filtering component 1604. After performing polyphase filtering, a permutation (e.g. π(L−b)) may be applied on outputs (e.g. $\hat{u}_0$ to $\hat{u}_{L-1}$) of the polyphase filtering component 1604. As shown, IDFT may be performed on outputs (e.g. $\hat{u}_0$ to $\hat{u}_{b-1}$) of the permutation component 1606 by the L-point IFFT component 1608. The outputs of the L-point IFFT component 1608 may be provided as outputs (e.g. ŝ) of the IDFT-based AFB 1600 as described herein.

Similar to the SFB structure in equation (88), substituting equations (86) and (150) into equation (98), the output of the IDFT-based AFB may become $$\hat{s}^O\left(z^{\frac{L}{2}}\right) = \{[I_M \quad 0_{M\times(L-M)}]F_L^H P_{\pi b}^T A_2\}\left(z^{\frac{L}{2}}\right)c(z)Y(z) \quad (109)$$

$$= \{[I_M \quad 0_{M\times(L-M)}]F_L^H P_{\pi(L-b)} A_2\}\left(z^{\frac{L}{2}}\right)c(z)Y(z)$$

where $P_{\pi b}^T$ may be the permutation matrix of an inverse permutation of $P_{\pi b}$. The above equation may be interpreted such that the received sample sequence y[n] (e.g. the input shown in FIG. 16) may go through a delay chain and/or downsampling by $$\frac{L}{2}$$

(e.g. via the S/P conversion component 1602), polyphase filters $A_q(z^2)$, q=0, ..., L-1 (e.g. via the polyphase filtering component 1604), permutation $P_{\pi(L-b)}$ (e.g. via the permutation component 1606), IDFT (e.g. via the L-point IFFT component 1608), discarding irrelevant outputs from IDFT to obtain estimated OQAM modulated symbol sequences $s_k^O[n]$, k=0, ..., M-1 (e.g. the outputs shown in FIG. 16). Such embodiments may result in the polyphase structure in FIG. 16 where the irrelevant outputs may be marked with stars. In discrete time domain, the output of the IDFT-based AFB may be written as $$\hat{s}^O[n] = [I_M 0_{M\times(L-M)}]F_L^H P_{\pi(L-b)}\hat{u}[n] \quad (110)$$

where each element of û[n] may be given in equation (102).

Figure 17:
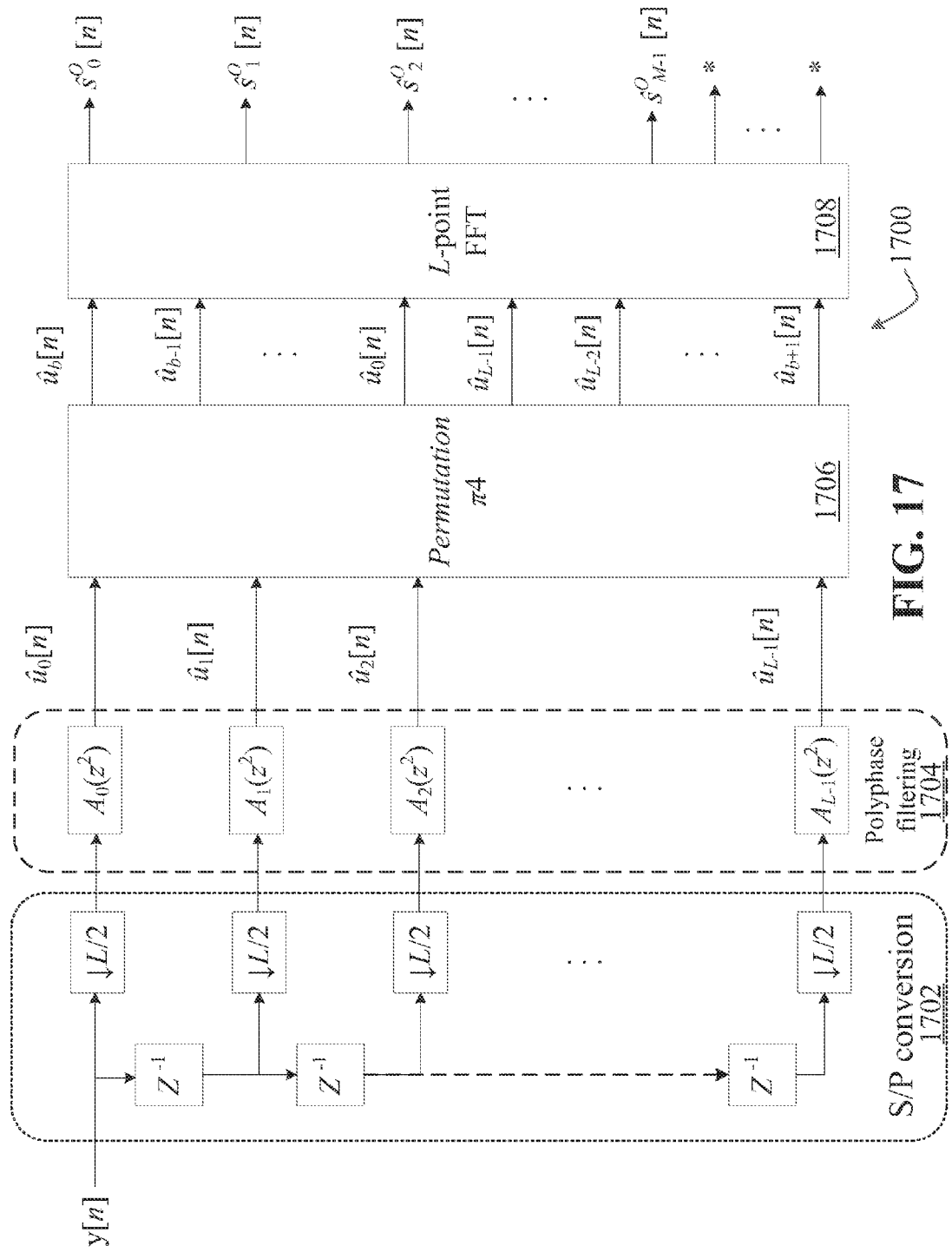
FIG. 17 depicts an example embodiment of a structure of DFT-based OFDM-OQAM AFB for a length (e.g. Lp) where the length may be odd.

FIG. 17 depicts an example embodiment of a structure of a DFT-based OFDM-OQAM AFB 1700 for a length (e.g. $L_p$) where the length may be odd. As shown, the DFT-based AFB 1700 may include a S/P conversion component 1702, a polyphase filtering component 1704, a permutation component 1706, and an L-point FFT component 1708. The AFB 1700 may receive an input (e.g. y[n]) that may be downsampled and/or may have a delay chain applied with the S/P conversion component 1702. The outputs of the S/P conversion component 1702 may be received by the polyphase filtering component 1704. After performing polyphase filtering, a permutation (e.g. π4) may be applied on outputs (e.g. $\hat{u}_0$ to $\hat{u}_{L-1}$) of the polyphase filtering component 1704. As shown, DFT may be performed on outputs (e.g. $\hat{u}_0$ to $\hat{u}_{b+1}$) of the permutation component 1706 by the L-point FFT component 1708. The outputs of the L-point FFT component 1708 may be provided as outputs (e.g. ŝ) of the DFT-based AFB 1700 as described herein.

In such an embodiment, equations (105) and (150) may be substituted into equation (109). Substituting (105) and (150) into (109), the output of the DFT-based AFB (e.g. 1700) may be $$\hat{s}^O\left(z^{\frac{L}{2}}\right) = \{[I_M \quad 0_{M\times(L-M)}]F_L P_{\pi 1} P_{\pi b}^T A_2\}\left(z^{\frac{L}{2}}\right)c(z)Y(z) \quad (111)$$

$$= \{[I_M \quad 0_{M\times(L-M)}]F_L P_{\pi 1} P_{\pi(L-b)} A_2\}\left(z^{\frac{L}{2}}\right)c(z)Y(z)$$

$$= \{[I_M \quad 0_{M\times(L-M)}]F_L P_{\pi 4} A_2\}\left(z^{\frac{L}{2}}\right)c(z)Y(z)$$

where $$P_{\pi 4} = P_{\pi 1} P_{\pi(L-b)} \quad (112)$$

may be the permutation matrix for π4:{1, 2, ..., b, b+1, b+2, ..., L}→{b+1, b, ..., 1, L, L-1, ..., b+2}. The above equation (111) may be interpreted such that that the received sample sequence y[n] (e.g. the input shown in FIG. 17) may go through a delay chain and/or downsampling by $$\frac{L}{2}$$

(e.g. via the S/P conversion component 1702), polyphase filters $A_q(z^2)$, q=0, ..., L-1 (e.g. via the polyphase filtering component 1704), permutation $P_{\pi 1}P_{\pi(L-b)}$ (e.g. via the permutation component 1706), DFT (e.g. via the L-point FFT component 1708), discarding irrelevant outputs from DFT to obtain estimated OQAM modulated symbol sequences $\hat{s}_k^O[n]$, k=0, ..., M-1 (e.g. the outputs shown in FIG. 17). Such embodiments may result in the polyphase structure shown in FIG. 17 where the irrelevant outputs may be marked with stars. In discrete time domain, the output of the DFT-based AFB (e.g. 1700) may be written as $$\hat{s}^O[n] = [I_M 0_{M\times(L-M)}]F_L P_{\pi 4}\hat{u}[n] \quad (113)$$

where each element of û[n] may be given in (102).

In such an embodiment, the IDFT or DFT may have real and imaginary (e.g. purely real and imaginary) outputs. The outputs may be computed (e.g. more efficiently using) a cosine modulated filter bank (CMFB) and a sine modulated filter bank (SMFB) as in the AFB of the critically sampled exponentially modulated filter bank (EMFB) (e.g. such that the AFB complexity may be reduced). Such a type of structure may not be backward compatible to OFDM.

The complexity associated with the AFB (e.g. such as AFBs 1600 and/or 1700) may be reduced as described herein. For example, the number of real multiplications of an L-point FFT with M complex outputs as $\mu_{FFT}^C(M, L)$ (e.g. where $\mu_{FFT}^C(M, L) = \mu_{IFFT}^C(M, L)$).

For comparison, the number of real multiplications for each of the M QAM symbols in the OFDM AFB may be derived as $$\mu_{OFDM,AFB}(M,L) = \lambda_{OFDM,SFB}(M,L) = \mu_{IFFT}^C(M,L) \le L \log_2 L - 3L + 4 \quad (114)$$

In an embodiment (e.g. for a general $L_p$ of any suitable length), the structure of the IDFT-based AFB may be based on equation (98) and may be shown in FIG. 14 and that of the DFT-based AFB with $\beta_k$-multipliers may be based on equation (107) and may be shown in FIG. 15. Additionally, the permutations may be multiplication-free. As such, the total number of real multiplications for each of the M QAM symbols and/or equivalently 2M OQAM symbols may be $$\mu_{OFDM-OQAM,AFB}(M,L,L_p) = \mu_{OFDM-OQAM,SFB}(M,L,L_p) = 4M + 2\mu_{IFFT}^C(M,L) + 4L_p \le 2L \log_2 L - 6L + 4L_p + 4M + 8. \quad (115)$$

When $L_p$ may be odd (e.g. the special case), the structure of the IDFT-based AFB may be based on equation (110) and may be shown in FIG. 16 and that of the DFT-based AFB may be based on equation (111) and may be shown in FIG. 17. In an embodiment, there may be no multipliers after the IDFT or DFT and, as such, the complexity of AFB may be reduced (e.g. slightly reduced). The total number of real multiplications for each of the M QAM symbols and equivalently 2M OQAM symbols may be $$\mu_{OFDM-OQAM,AFB,L_p odd}(M,L,L_p) = 2\mu_{IFFT}^C(M,L) + 4L_p \le 2L \log_2 L - 6L + 4L_p + 8. \quad (116)$$

According to an example embodiment, the IDFT or DFT may have real and imaginary (e.g. purely real and imaginary) outputs. The outputs may be computed (e.g. more efficiently) using a cosine modulated filter bank (CMFB) and a sine modulated filter bank (SMFB) as in the AFB of the critically sampled exponentially modulated filter bank (EMFB). Then, the AFB complexity may be reduced. Such a type of structure may not be backward compatible to or with OFDM.

The complexity associated with the structures of OFDM-OQAM (e.g. the proposed efficient structures herein) may be reduced as described herein. For example, for comparison, the total number of real multiplications for every M QAM symbols in OFDM as $$\mu_{OFDM}(M,L) = \mu_{OFDM,SFB}(M,L) + \mu_{OFDM,AFB}(M,L) = 2\mu_{IFFT}^C(M,L) \leq 2(L \log_2 L - 3L + 4) = 2L \log_2 L - 6L + 8 \quad (117)$$

As such, in an embodiment, an overall complexity of the efficient structure of OFDM-OQAM may be evaluated by the total number of real multiplications of OQAM pre-processing, SFB, AFB, and OQAM post-processing, i.e., $$\mu_{OFDM-OQAM}(M, L, L_p) = \mu_{OFDM-OQAM,SFB}(M, L, L_p) + \quad (118)$$

$$\mu_{OFDM-OQAM,AFB}(M, L, L_p)$$

$$= 2(4M + 2\mu_{IFFT}^C(M, L) + 4L_p)$$

$$= 8M + 4\mu_{IFFT}^C(M, L) + 8L_p \leq 4L\log_2 L -$$

$$12L + 8L_p + 8M + 16$$

for a general $L_p$, and $$\mu_{OFDM-OQAM,L_p odd}(M, L, L_p) = \mu_{OFDM-OQAM,SFB,L_p odd}(M, L, L_p) + \quad (119)$$

$$\mu_{OFDM-OQAM,AFB,L_p odd}(M, L, L_p)$$

$$= (2\mu_{IFFT}^{R/I}(M, L) + 4L_p) +$$

$$(2\mu_{IFFT}^C(M, L) + 4L_p)$$

$$= 2\mu_{IFFT}^C(M, L) + 2\mu_{IFFT}^{R/I}(M, L) +$$

$$8L_p \leq 3L\log_2 L - 10L + 8L_p + 16$$

when $L_p$ may be odd (e.g. the special case). In an embodiment, in equations (118) and (119), the dominant term may be $L \log_2 L$ when $L$ may be large and may be $L_p$ when $L$ may not be large enough.

In an embodiment, in a critically sampled (CS) OFDM and a CS OFDM-OQAM, i.e., L=M, the complexities may be lower (e.g. the lowest) in the respective categories. The complexity of a CS OFDM may be $$\mu_{OFDM}(M,M) = 2\mu_{IFFT}^C(M,M) = 2M \log_2 M - 6M + 8. \quad (120)$$

Additionally, the complexity of a CS OFDM-OQAM for a general $L_p$ may be $$\mu_{OFDM-OQAM}(M, L, L_p) = 8M + 4\mu_{IFFT}^C(M, M) + 8L_p \quad (121)$$

$$= 4M\log_2 M - 12M + 8L_p + 8M + 16$$

$$= 4M\log_2 M - 4M + 8L_p + 16$$

(e.g. which may the same as other embodiments that may be described herein). The complexity of a CS OFDM-OQAM when $L_p$ may be odd (e.g. the special case) may be $$\mu_{OFDM-OQAM,L_p odd}(M, L, L_p) = 2\mu_{IFFT}^C(M, M) + \quad (122)$$

$$2\mu_{IFFT}^{R/I}(M, M) + 8L_p$$

$$= 3M\log_2 M - 10M + 8L_p + 16$$

that may be lower than other embodiments (e.g. when $L_p$=KL+1 may be assumed).

Figure 18:
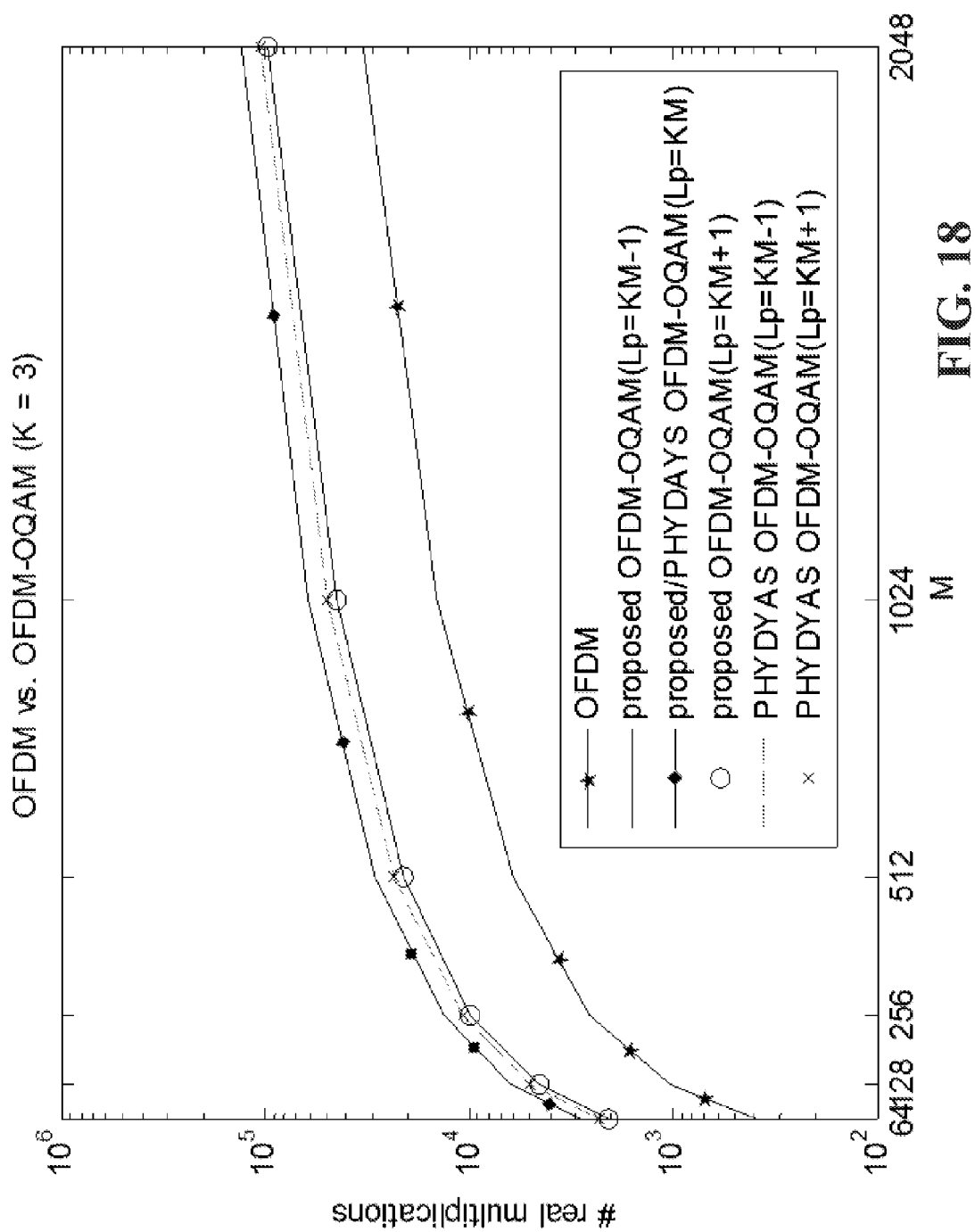
FIG. 18 depicts an example embodiment of a graph comparing real multiplications of OFDM, OFDM-OQAM described herein (e.g. a proposed structure), and PHYDYAS OFDM-OQAM for K=3.
Figure 19:
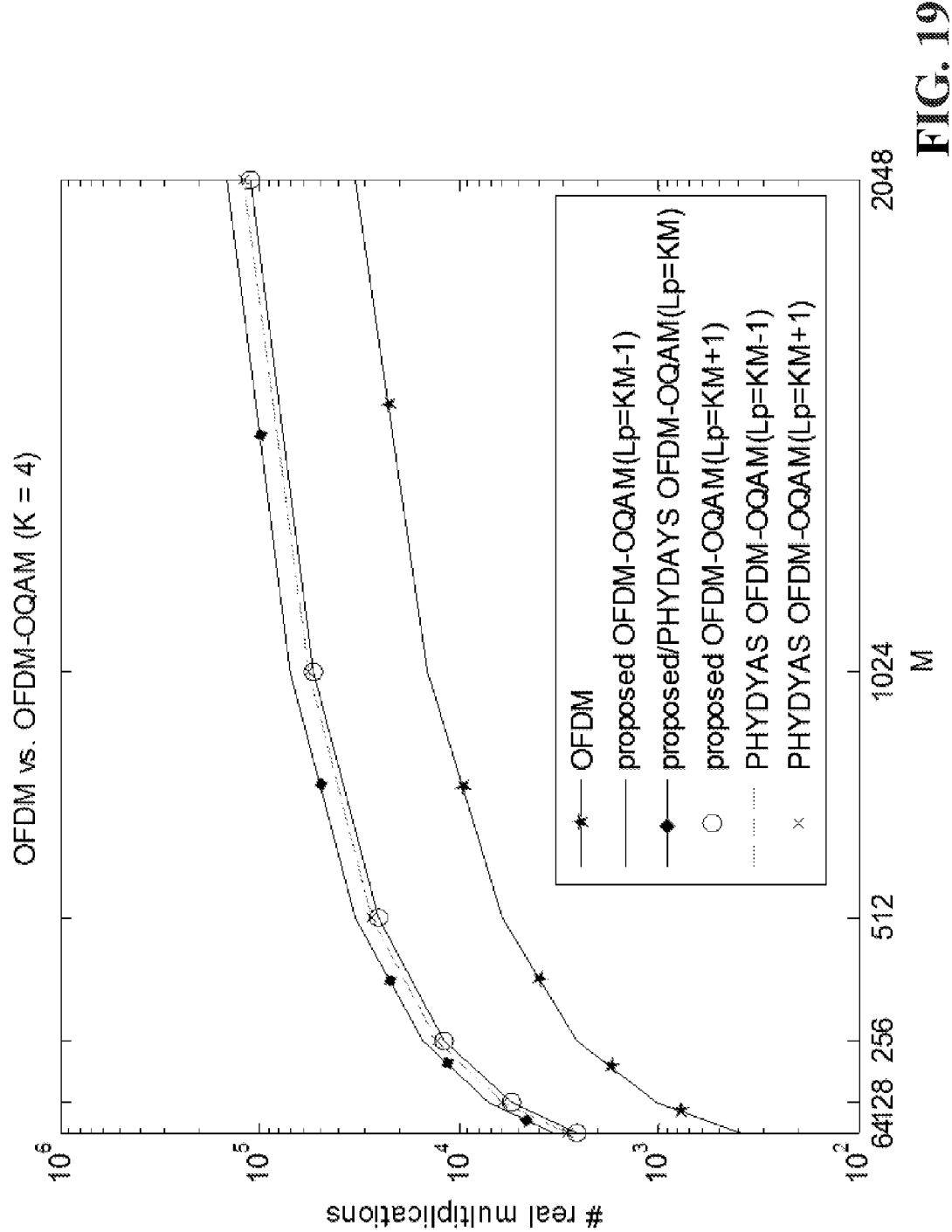
FIG. 19 depicts an example embodiment of a graph comparing real multiplications of OFDM, OFDM-OQAM described herein (e.g. a proposed structure), and PHYDYAS OFDM-OQAM for K=4.

In an embodiment, the number of multiplications of the CS OFDM, the structure of the CS OFDM-OQAM (e.g. proposed herein), and PHYDYAS CS OFDM-OQAM for a different number of subcarriers may be plotted in FIG. 18 (for K=3) and FIG. 19 (for K=4). As shown in FIG. 18 and FIG. 19, the structure of OFDM-OQAM disclosed herein (e.g. the proposed structure) may have lower complexities than, for example, PHYDYAS OFDM-OQAM when $L_p$ may be odd (e.g., $L_p$=KL±1). The normalized complexity of the CS OFDM, the structure of CS OFDM-OQAM (e.g. the proposed structure), and the PHYDYAS CS OFDM-OQAM for different number of subcarriers may be plotted in FIG. 20 (for K=3) and FIG. 21 (for K=4).

Figure 20:
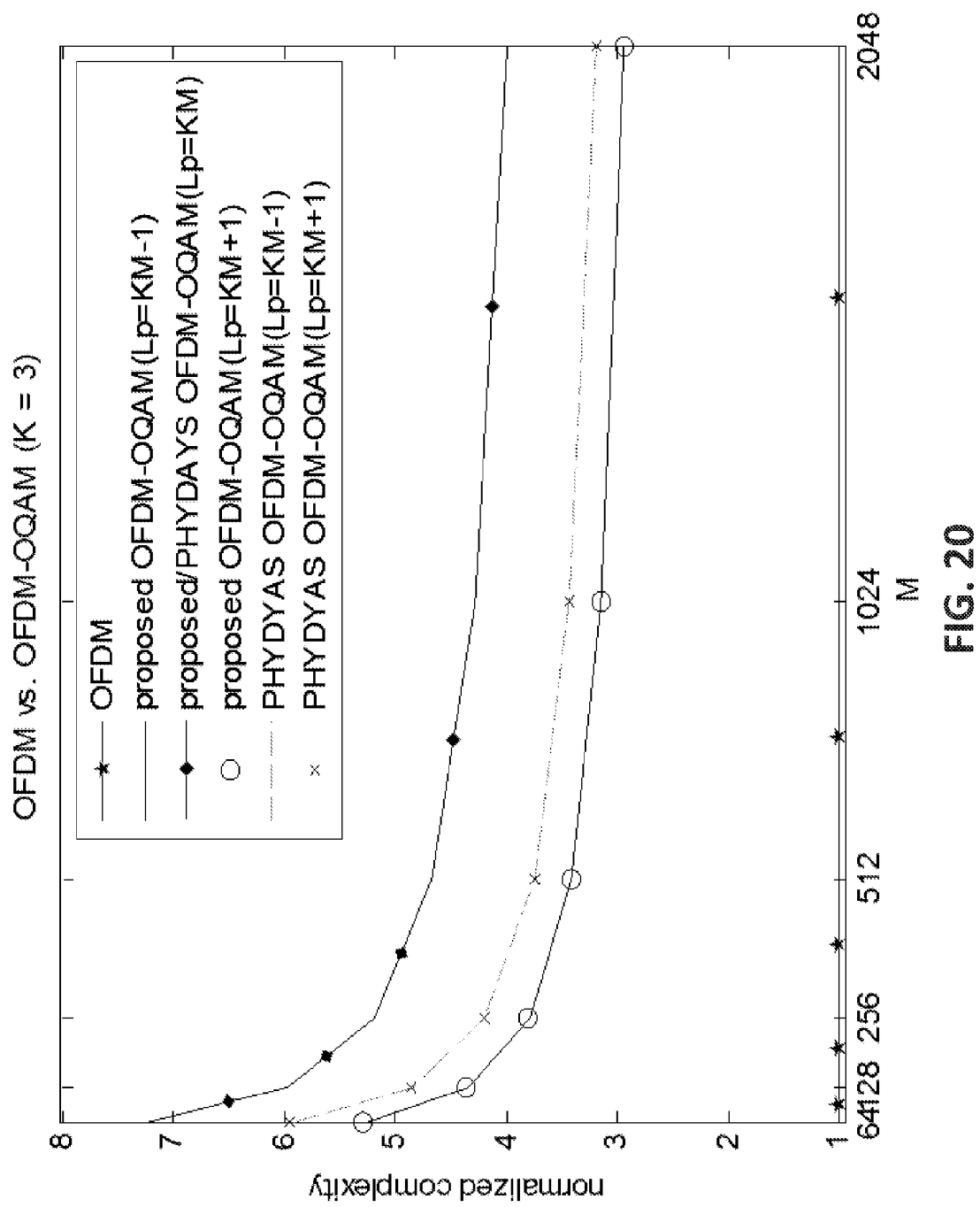
FIG. 20 depicts an example embodiment of a graph comparing normalized complexities (e.g. normalized such that the complexity of OFDM may be 1) of OFDM, OFDM-OQAM described herein (e.g. a proposed structure), and PHYDYAS OFDM-OQAM for K=3.
Figure 21:
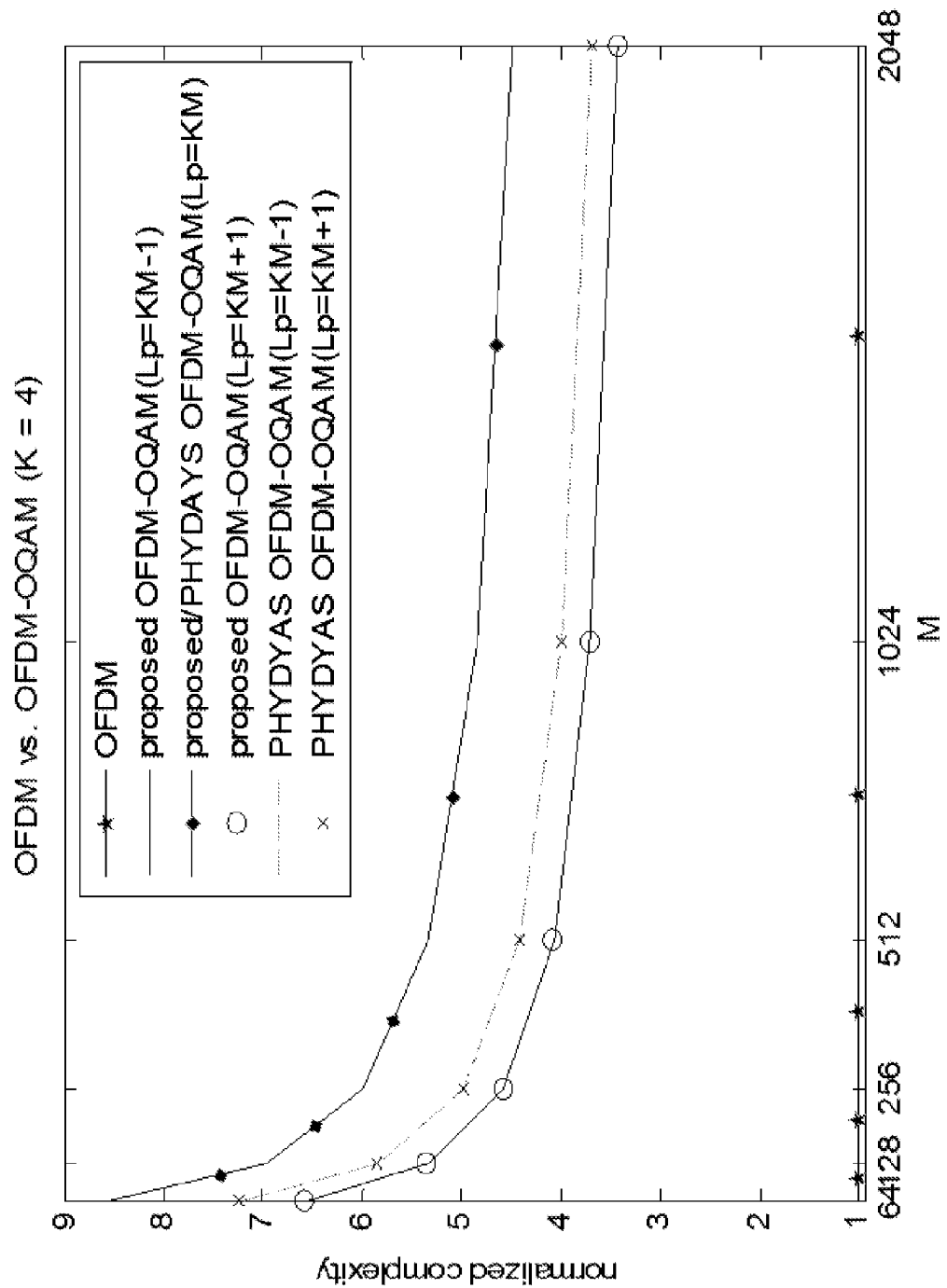
FIG. 21 depicts an example embodiment of a graph comparing normalized complexities (e.g. normalized such that the complexity of OFDM may be 1) of OFDM, OFDM-OQAM described herein (e.g. a proposed structure), and PHYDYAS OFDM-OQAM for K=4.

The complexities for each number of subcarriers may be normalized such that the complexity of OFDM may be 1. In an embodiment, the case when $L_p$ may be odd (e.g., $L_p$=KL±1) may be of particular relevance as disclosed herein. As shown in FIG. 20, the complexity of the structure of OFDM-OQAM disclosed herein (e.g. the proposed structure) may be slightly below 3 times that of OFDM when, for example, the number of subcarriers may be 2048. Also, as shown in FIG. 21, the complexity of the structure of OFDM-OQAM disclosed herein (e.g. the proposed structure) may be below 3.5 times that of OFDM when, for example, the number of subcarriers may 2048. In an example, the proposed structure may have a lower complexity than other embodiments of PHYDYASs when $L_p$ may be odd.

According to an example embodiment, DFT and IDFT may be compatible such that a permutation may be provided before an IDFT to change the IDFT to DFT and before a DFT to change the DFT to IDFT as described herein. For example, the following may be defined $$W_L = e^{-j\frac{2\pi}{L}}. \quad (123)$$

The constant L-point DFT matrix may be $$F_L = \begin{bmatrix} 1 & 1 & \cdots & 1 \\ 1 & W_L & \cdots & W_L^{L-1} \\ \vdots & \vdots & \ddots & \vdots \\ 1 & W_L^{L-1} & \cdots & W_L^{(L-1)(L-1)} \end{bmatrix} = [w_0 \; w_1 \; \cdots \; w_{L-1}] \quad (124)$$

where the qth column may be $$w_q = [1 \; W_L^q \; \cdots \; W_L^{q(L-1)}]^T, q=0,1,\ldots,L-1. \quad (125)$$

In an embodiment, the DFT of a length-L sequence may include, may use, and/or may be $$x = [x_0 x_1 \ldots x_{L-1}]^T \quad (126)$$

as $$X = [X_0 X_1 \ldots X_{L-1}]^T \quad (127)$$

As such, in an embodiment (e.g. by definition), the DFT may be expressed as $$X = F_L x \quad (128)$$

and the IDFT may be expressed as $$x = \frac{1}{L} F_L^H X. \quad (129)$$

The DFT matrix and IDFT matrix may also satisfy $$F_L F_L^H = F_L^H F_L = L I_L. \quad (130)$$

In an embodiment, the IDFT related matrix $F_L^H$ could be rewritten as $$F_L^H = \begin{bmatrix} 1 & 1 & \cdots & 1 \\ 1 & W_L^{-1} & \cdots & W_L^{-(L-1)} \\ \vdots & \vdots & \ddots & \vdots \\ 1 & W_L^{-(L-1)} & \cdots & W_L^{-(L-1)(L-1)} \end{bmatrix} = [w_0 \ w_{-1} \ \cdots \ w_{-(L-1)}]. \quad (131)$$

Since $W_L^k = W_L^{L-k}$ for an integer k, $w_{-q}$ may be rewritten as $$w_{-q} = [1 \ W_L^{-q} \ \cdots \ W_L^{-q(L-1)}]^T = [1 \ W_L^{L-q} \ \cdots \ W_L^{(L-q)(L-1)}]^T = w_{L-q}. \quad (132)$$

As such, the IDFT related matrix $F_L^H$ may be written as $$F_L^H = [w_0 \ w_{L-1} \ \cdots \ w_1] = F_L \begin{bmatrix} 1 & 0 & \cdots & \cdots & 0 \\ 0 & \cdots & \cdots & 0 & 1 \\ 0 & \cdots & 0 & 1 & 0 \\ \vdots & \ddots & \ddots & \ddots & \vdots \\ 0 & 1 & 0 & \cdots & 0 \end{bmatrix} = F_L P_{\pi 1} \quad (133)$$

where the permutation matrix for permutation $\pi 1$: $\{1, 2, 3, \ldots, L\} \to \{1, L, L-1, \ldots, 2\}$ may be $$P_{\pi 1} = \begin{bmatrix} 1 & 0 & \cdots & \cdots & 0 \\ 0 & \cdots & \cdots & 0 & 1 \\ 0 & \cdots & 0 & 1 & 0 \\ \vdots & \ddots & \ddots & \ddots & \vdots \\ 0 & 1 & 0 & \cdots & 0 \end{bmatrix}. \quad (134)$$

Figure 22A:
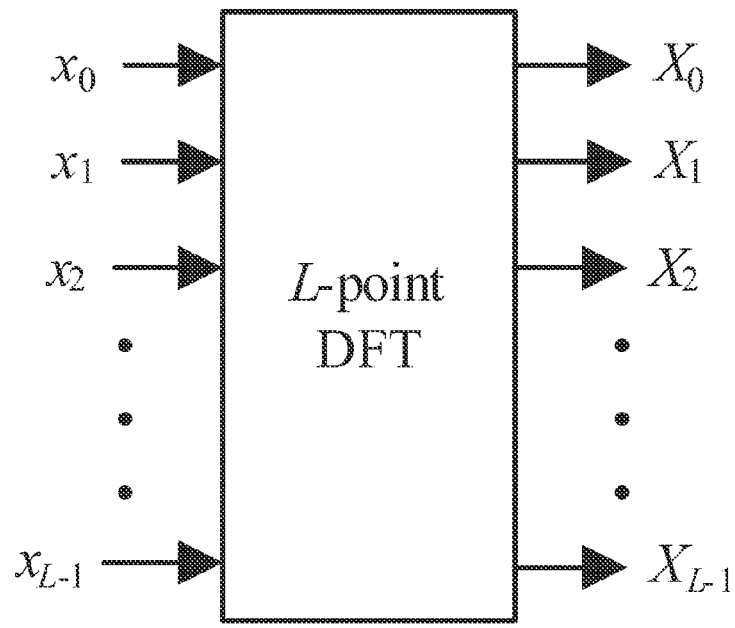
FIGS. 22A-B depict example embodiments of L-point DFT and L-point IDFT (e.g. via DFT) respectively.
Figure 22B:
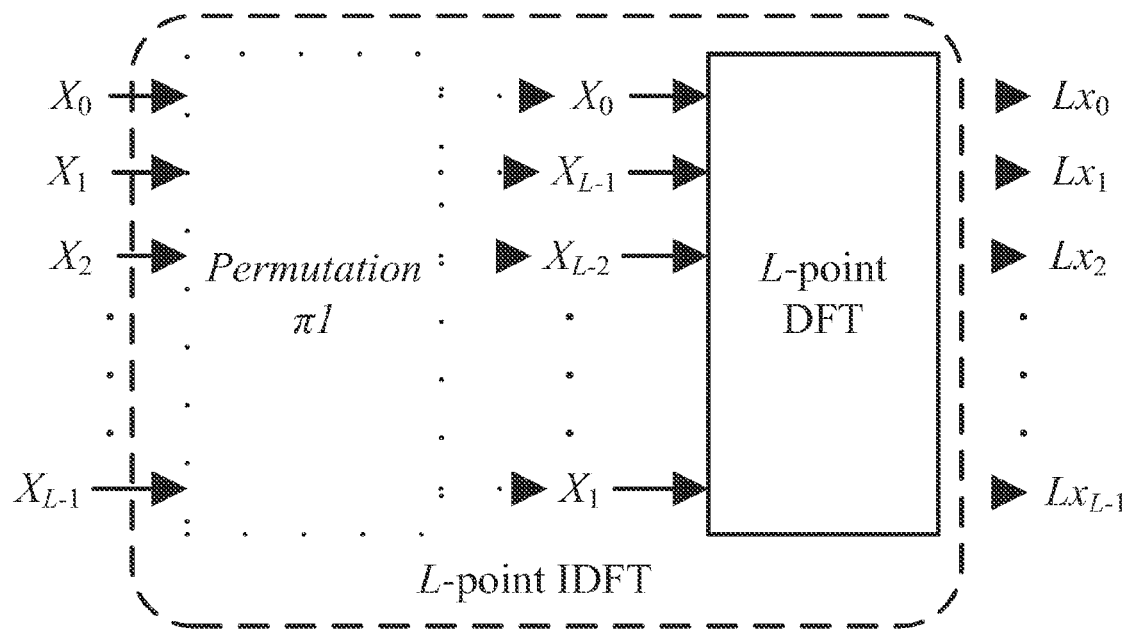

In an embodiment, if the L-point DFT may be implemented as shown in FIG. 22A, the corresponding L-point IDFT without the scaling factor $$\frac{1}{L}$$

in equation (129) may be implemented using the L-point DFT with the permutation $\pi 1$ as shown in FIG. 22B.

In another embodiment, the permutation matrix $P_{\pi 1}$ may be a symmetric matrix, and, thus, may have the property $$P_{\pi 1} P_{\pi 1} = I_L. \quad (135)$$

Additionally, equation (133) may be right multiplied by $P_{\pi 1}$, for example, to obtain or generate $$F_L = F_L^H P_{\pi 1}. \quad (136)$$

Figure 23A:
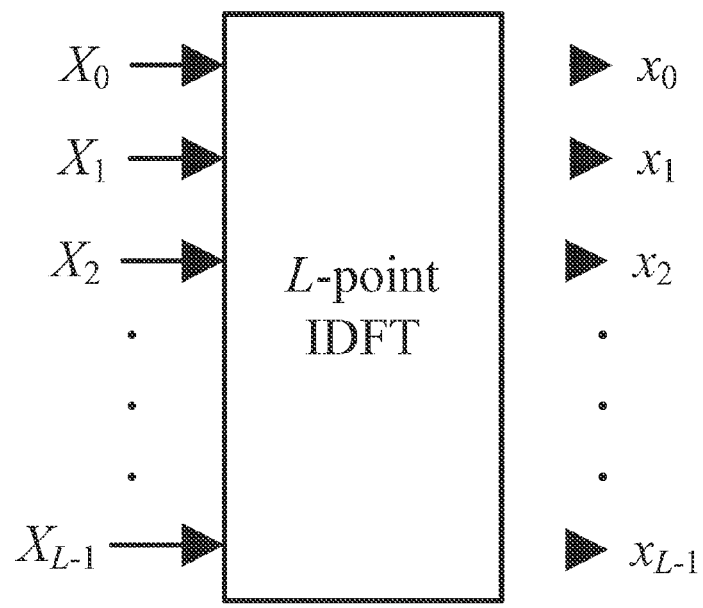
FIGS. 23A-B depict example embodiments of L-point IDFT and L-point DFT (e.g. via IDFT) respectively.
Figure 23B:
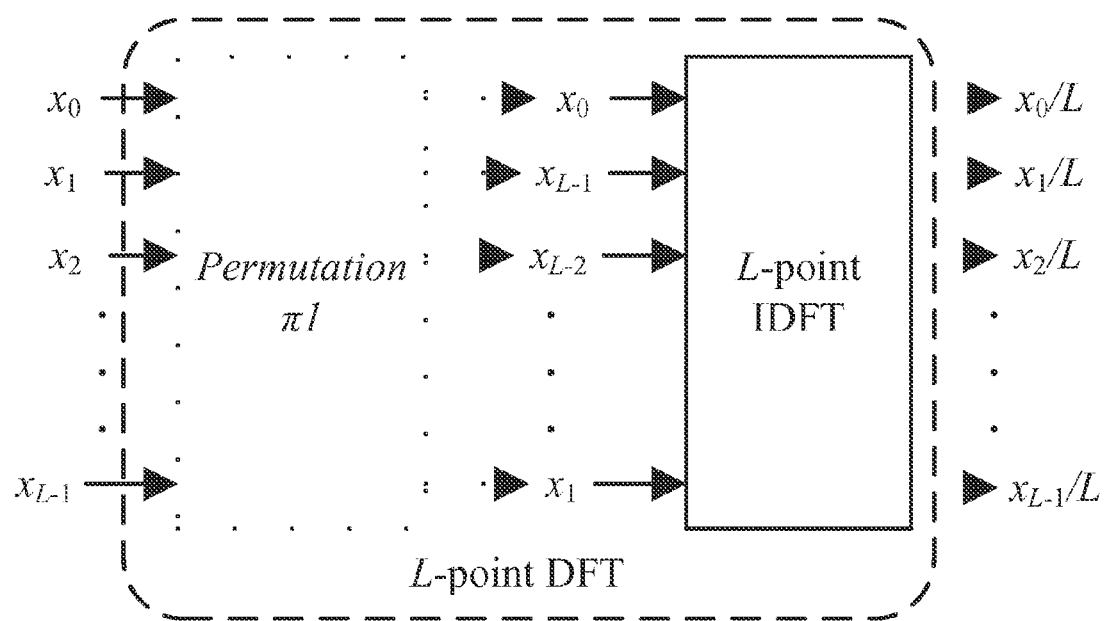

In an example, if the L-point IDFT may be implemented as shown in FIG. 23A, the corresponding L-point DFT scaled by the factor $$\frac{1}{L}$$

may be implemented using the L-point IDFT with the permutation $\pi 1$ as shown in FIG. 23B. As such, the DFT and IDFT may be compatible up to the permutation $\pi 1$.

A circulant matrix may also be provided and/or used as described herein. In an embodiment, a L×L circulant matrix may take the form of $$C_c = \begin{bmatrix} c_0 & c_{L-1} & c_{L-2} & \cdots & c_1 \\ c_1 & c_0 & c_{L-1} & \cdots & c_2 \\ c_2 & c_1 & c_0 & \vdots & c_3 \\ \vdots & \vdots & \vdots & \ddots & \vdots \\ c_{L-1} & c_{L-2} & c_{L-3} & \cdots & c_0 \end{bmatrix} \quad (137)$$

and may be fully specified by the first column, vector $c = [c_0 \ c_1 \ \cdots \ c_{L-1}]^T$. The remaining columns may be a cyclic permutation of c with an offset (e.g. equal to the column index). The singular value decomposition (SVD) of the circulant matrix $C_c$ may be given by $$C_c = \frac{1}{L} F_L^H \Lambda F_L \quad (138)$$

where $F_L$ may be the L×L DFT matrix in equation (124) and $F_L^H$ may be the L×L IDFT matrix in (131). From equation (138), $C_c$ may be diagonalized with the DFT and IDFT matrix. $\Lambda = \text{diag}\{\lambda\}$ (e.g. where $\lambda = [\lambda_0, \lambda_1, \ldots, \lambda_{L-1}]^T$) may be an L×L diagonal matrix with eigenvalues of $C_c$, and the eigenvalues may be given by $$\lambda_q = \sum_{l=0}^{L-1} c_l W_L^{ql} = c^T w_q = w_q^T c, \ q = 0, 1, \ldots, L-1 \quad (139)$$

where $W_L$ may be defined in equation (123) and $w_q$ may be defined in equation (125). In an embodiment, the eigenvalue vector may be rewritten as $$\lambda = F_L c. \quad (140)$$

Additionally, a permutation matrix may be provided and/or used as described herein. For example, a permutation matrix $P_\pi$ for a permutation $\pi$: $\{1, 2, 3, \ldots, L\} \to \{e_1, e_2, e_3, \ldots, e_{L-1}\}$, where $e_i \in \{1, 2, 3, \ldots, L\}$, and $e_i \neq e_j$ for $i \neq j$, may be defined such that $$[e_1 e_2 \ldots e_L]^T = P_\pi [1 \ 2 \ldots L]^T. \quad (141)$$

In an embodiment, each row and each column in $P_\pi$ may have one non-zero element that may be 1. The inverse of a permutation matrix may be equal to its transpose, i.e., $$P_\pi^{-1} = P_\pi^T. \quad (142)$$

One example of the permutation matrix may be $P_{\pi 1}$ in equation (134). For another example, the following permutation matrix $$P_{\pi b} = \begin{bmatrix} 0_{b \times (L-b)} & I_b \\ I_{L-b} & 0_{(L-b) \times b} \end{bmatrix} \quad (143)$$

may be used for the permutation $\pi b$:$\{1, 2, \ldots, L-b, L-b+1, L-b+2, \ldots, L\} \rightarrow \{L-b+1, L-b+2, \ldots, L, 1, 2, \ldots, L-b\}$, where $0 \le b \le L-1$. According to an example embodiment, $P_{\pi b}$ may be both a permutation matrix and a circulant matrix with the first column being $[0_{1 \times b} \ 1 \ 0_{1 \times (L-b-1)}]^T$, i.e., $$[P_{\pi b}]_{l,1} = \begin{cases} 1, & l = \mathrm{mod}(b, L) \\ 0, & l \ne \mathrm{mod}(b, L) \end{cases}. \quad (144)$$

As such, in equation (138), $P_{\pi b}$ may be diagonalized with the DFT and IDFT matrix, i.e., $$P_{\pi b} = \frac{1}{L} F_L^H \Lambda_{\pi b} F_L \quad (145)$$

where the diagonal matrix $$\Lambda_{\pi b} = \begin{bmatrix} \lambda_{\pi b,0} & & & \\ & \lambda_{\pi b,1} & & \\ & & \ddots & \\ & & & \lambda_{\pi b,L-1} \end{bmatrix} \quad (146)$$

may have the eigenvalues of $P_{\pi b}$ being $$\lambda_{\pi b,q} = \sum_{l=0}^{L-1} [P_{\pi b}]_{l,1} W_L^{ql} = W_L^{qb}, \ q = 0, 1, \ldots, L-1. \quad (147)$$

Thus, $\Lambda_{\pi b}$ may become $$\Lambda_{\pi b} = \begin{bmatrix} 1 & & & \\ & W_L^b & & \\ & & \ddots & \\ & & & W_L^{b(L-1)} \end{bmatrix}. \quad (148)$$

Alternatively, in an embodiment, the DFT and IDFT matrices may satisfy equation (130). Additionally, (145) may be left and right multiplied by $$F_L \text{ and } \frac{1}{L} F_L^H,$$

respectively, to obtain or generate $$\Lambda_{\pi b} = F_L P_{\pi b} \frac{1}{L} F_L^H. \quad (149)$$

The inverse of $P_{\pi b}$ may be $$P_{\pi b}^{-1} = P_{\pi b}^T = \begin{bmatrix} 0_{(L-b) \times b} & I_{L-b} \\ I_b & 0_{b \times (L-b)} \end{bmatrix} = P_{\pi(L-b)} \quad (150)$$

which may be the permutation matrix for the permutation $\pi(L-b)$:$\{1, 2, \ldots, b, b+1, b+2, \ldots, L\} \rightarrow \{b+1, b+2, \ldots, L, 1, 2, \ldots, b\}$, where $0 \le b \le L-1$.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for providing an orthogonal frequency division multiplexing-offset quadrature amplitude modulation (OFDM-OQAM) synthesis filter bank (SFB) structure having an odd filter length, the method comprising:
   receiving offset quadrature amplitude modulation (OQAM) inputs;
   performing an inverse discrete Fourier transform (IDFT) on the OQAM inputs to generate IDFT outputs;
   applying a permutation to the IDFT outputs to generate permutation outputs;
   applying polyphase filters and a parallel-to-serial (P/S) conversion to the permutation outputs to generate an SFB output for the SFB structure having the odd filter length, wherein applying the P/S conversion comprises upsampling the permutation outputs after applying the polyphase filters and performing a delay chain on the permutation outputs after applying the polyphase filters; and
   sending the SFB output.

2. The method of claim 1, further comprising:
   performing zero-padding on the OQAM inputs.

3. The method of claim 1, wherein the OQAM inputs comprise OQAM modulated symbol sequences.

4. The method of claim 1, wherein the permutation comprises a permutation matrix $P_{\pi b}$ with a corresponding permutation $\pi b$, and wherein $$b = \frac{(L_p - 1)}{2}$$

and $L_p$ is the odd filter length.

5. The method of claim 1, wherein the permutation outputs are upsampled by $$\frac{L}{2}$$

where L is a fast Fourier transform (FET) size associated with the IDFT.

6. The method of claim 1, wherein performing the delay chain on the permutation outputs after applying the polyphase filters comprises generating a summation of the upsampled outputs.

7. A method for providing an orthogonal frequency division multiplexing-offset quadrature amplitude modulation (OFDM-OQAM) inverse discrete Fourier transform (IDFT)-based analysis filter bank (AFB) structure having an odd filter length, the method comprising:
receiving a sample sequence;
applying a serial-to-parallel (S/P) conversion and polyphase filters to the sample sequence to generate outputs, wherein applying the S/P conversion comprises performing a delay chain on the sample sequence to generate a plurality of sequences associated with the sample sequence and downsampling each of the plurality of sequences associated with the sample sequence to generate the outputs;
applying a permutation to the outputs to generate permutation outputs;
performing an inverse discrete Fourier transform (IDFT) on the permutation outputs to generate AFB outputs for the AFB structure having the odd filter length
sending the AFB outputs.

8. The method of claim 7, further comprising:
discarding irrelevant outputs from associated with the IDFT performed on the permutation outputs.

9. The method of claim 7, wherein the permutation comprises a permutation matrix $P_{\pi(L-b)}$ with a corresponding permutation $\pi(L-b)$ where $$b = \frac{(L_p - 1)}{2},$$

$L_p$ is the odd filter length, and L is a fast Fourier transform (FET) size associated with the IDFT.

10. The method of claim 7, wherein the plurality of sequences are downsampled by $$\frac{L}{2}$$

where L is a fast Fourier transform (FFT) size associated with the IDFT.

11. A method for providing an orthogonal frequency division multiplexing-offset quadrature amplitude modulation (OFDM-OQAM) discrete Fourier transform (DFT)-based analysis filter bank (AFB) structure having an odd filter length, the method comprising:
receiving a sample sequence;
applying a serial-to-parallel (S/P) conversion and polyphase filters to the sample sequence to generate outputs;
applying a permutation to the outputs to generate permutation outputs;
performing a discrete Fourier transform (DFT) on the permutation outputs to generate AFB outputs for the AFB structure having the odd filter length; and
sending the AFB outputs.

12. The method of claim 11, further comprising:
discarding irrelevant outputs from associated with the DFT performed on the permutation outputs.

13. The method of claim 11, wherein the permutation comprises a permutation matrix $P_{\pi 4}$ with a corresponding permutation $\pi 4$, wherein the corresponding permutation $\pi 4$ comprises a permutation $\pi 1$ multiplied by a permutation $\pi(L-b)$ where $$b = \frac{(L_p - 1)}{2},$$

$L_p$ is the odd filter length, and L is a fast Fourier transform (FFT) size associated with the DFT.

14. The method of claim 11, wherein applying the S/P conversion further comprises:
performing a delay chain on the sample sequence to generate a plurality of sequences associated with the sample sequence; and
downsampling each of the plurality of sequences associated with the sample sequence to generate the outputs.

15. The method of claim 14, wherein the plurality of sequences are downsampled by $$\frac{L}{2}$$

where L is a fast Fourier transform (FFT) size associated with the DFT.

* * * * *